United States Patent
Kim et al.

(10) Patent No.: US 11,203,011 B2
(45) Date of Patent: Dec. 21, 2021

(54) NITROGEN OXIDE REDUCTION CATALYST REGENERABLE AT LOW TEMPERATURE

(71) Applicant: KOREA INSTITUTE OF SCIENCE AND TECHNOLOGY, Seoul (KR)

(72) Inventors: Jong Sik Kim, Seoul (KR); Heon Phil Ha, Seoul (KR); Dong Wook Kwon, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 293 days.

(21) Appl. No.: 16/354,406

(22) Filed: Mar. 15, 2019

(65) Prior Publication Data
US 2020/0215518 A1 Jul. 9, 2020

(30) Foreign Application Priority Data

Jan. 4, 2019 (KR) ........................ 10-2019-0001371

(51) Int. Cl.
| | | |
|---|---|---|
| *B01J 23/22* | (2006.01) | |
| *B01J 23/34* | (2006.01) | |
| *B01J 23/847* | (2006.01) | |
| *B01D 53/86* | (2006.01) | |
| *B01D 53/94* | (2006.01) | |
| *B01J 21/06* | (2006.01) | |
| *B01J 23/10* | (2006.01) | |
| *B01J 37/02* | (2006.01) | |
| *B01J 37/08* | (2006.01) | |
| *B01J 37/20* | (2006.01) | |

(52) U.S. Cl.
CPC ...... *B01J 23/8472* (2013.01); *B01D 53/8628* (2013.01); *B01D 53/9418* (2013.01); *B01J 21/063* (2013.01); *B01J 23/10* (2013.01); *B01J 23/22* (2013.01); *B01J 23/34* (2013.01); *B01J 37/02* (2013.01); *B01J 37/08* (2013.01); *B01J 37/20* (2013.01); *B01D 2255/2027* (2013.01); *B01D 2255/2061* (2013.01); *B01D 2255/2065* (2013.01); *B01D 2255/2073* (2013.01); *B01D 2255/20723* (2013.01); *B01D 2255/20746* (2013.01); *B01D 2255/20753* (2013.01); *B01D 2255/707* (2013.01)

(58) Field of Classification Search
None
See application file for complete search history.

(56) References Cited

U.S. PATENT DOCUMENTS 8,202,818 B2 * 6/2012 Sung .................. B01J 23/8472
502/248

FOREIGN PATENT DOCUMENTS

| CN | 107362793 A | 11/2017 |
|---|---|---|
| EP | 0 323 195 A2 | 7/1989 |
| EP | 0 323 195 A3 | 7/1989 |
| JP | H 01176431 A | 7/1989 |
| KR | 10-2012-0007062 A | 1/2012 |
| WO | 2016188989 | * 12/2016 |
| WO | WO 2018/056517 A1 | 3/2018 |

OTHER PUBLICATIONS

Ha Heon Phil et al., "$SO_2$ resistant antimony promoted $V_2O_5/TiO_2$ catalyst for $NH_3$-SCR of $NO_X$ at low temperatures", Applied Catalysis B: Environmental, 2008, pp. 301-308, vol. 78.
Xiaoyu Guo et al., "Effects of sulfate species on $V_2O_5/TiO_2$ SCR catalysts in coal and biomass-fired systems", Applied Catalysis B: Environmental, 2009, pp. 30-40, vol. 92.
International Search Report of PCT/KR2019/004192 dated Oct. 4, 2019.
Xin Zhao et al., Highly dispersed $V2O_5/TiO_2$ modified with transition metals (Cu, Fe, Mn, Co) as efficient catalysts for the selective reduction of NO with $HN_3$, Chinese Journal of Catalysis, 2015, pp. 1886-1899, vol. 36.
Adrian Marberger, Advances in Vanadium-Based Catalyst Research for the Selective Catalytic Reduction of $NO_X$ by $NH_3$, École Polytechnique Fédéral de Lausanne, 2017.
Korean Office Action dated Apr. 17, 2019.
Adrian Marberger et al., "Relationship between structures and activities of supported metal vanadates for the selective catalytic reduction of NO by $NH_3$," Applied Catalysis B: Environmental, Dec. 2017, pp. 731-742, vol. 218.
Extended European Search Report dated Oct. 22, 2019.

* cited by examiner

*Primary Examiner* — Sheng H Davis
(74) *Attorney, Agent, or Firm* — Rabin & Berdo, P.C.

(57) ABSTRACT

Provided is a nitrogen oxide ($NO_X$) reduction catalyst including an active site including at least one of a metal vanadate expressed by [Chemical Formula 1] and a metal vanadate expressed by [Chemical Formula 2], and a support for loading the active site thereon.

$$(M_1)_X V_2 O_{X+5} \qquad \text{[Chemical Formula 1]}$$

(where $M_1$ denotes one selected from among manganese (Mn), cobalt (Co), and nickel (Ni), and X denotes a real number having a value between 1 and 3.)

$$(M_2)_Y VO_4 \qquad \text{[Chemical Formula 2]}$$

(where $M_2$ denotes one selected from among lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu), and Y denotes a real number having a value between 0.5 and 1.5).

5 Claims, 11 Drawing Sheets

NITROGEN OXIDE REDUCTION CATALYST REGENERABLE AT LOW TEMPERATURE

CROSS-REFERENCE TO RELATED PATENT APPLICATION

This application claims the benefit of Korean Patent Application No. 10-2019-0001371, filed on Jan. 4, 2019, in the Korean Intellectual Property Office, the disclosure of which is incorporated herein in its entirety by reference.

BACKGROUND

1. Field

The present invention relates to a nitrogen oxide ($NO_X$) reduction catalyst and, more particularly, to a heterogeneous catalyst for $NO_X$ reduction, the catalyst including a metal vanadate as an active site loaded on a support, and a method of synthesizing the same.

2. Description of the Related Art

Currently, a chemical process for efficiently, environment-friendly, and continuously converting nitrogen oxide ($NO_X$) and ammonia ($NH_3$) which are main causes of secondary fine dust, e.g., selective catalytic reduction of $NO_X$ by $NH_3$ ($NH_3$-SCR) (see Reaction Formulas (1) and (2)), attracts much attention.

$$4NO+4NH_3+O_2 \rightarrow 4N_2+6H_2O \quad (1)$$

$$2NO_2+4NH_3+O_2 \rightarrow 3N_2+6H_2O \quad (2)$$

The $NH_3$-SCR process may be additionally improved by enhancing performance implementable by a currently used commercial catalyst. For example, the commercial catalyst used in the $NH_3$-SCR process of power plants, sintering furnaces, and vessels includes vanadium (V) oxide-$WO_3$/$TiO_2$ (where the V oxide includes at least one of $V_2O_3$, $VO_2$, and $V_2O_5$). As such, surface properties of the commercial catalyst are being improved. To this end, for example, V oxide used as an active site of the commercial catalyst may be structurally transformed. Specifically, a metal vanadate synthesized due to chemical binding of V oxide and metal oxide may be desirable as an active site of $NH_3$—SCR. More specifically, the metal vanadate is a composite oxide of V and another metal, and may solve, during $NH_3$-SCR, at least one of problems of the V oxide active site included in the commercial catalyst, e.g., 1) aggregation of the active site of the catalyst during $NH_3$-SCR due to a low melting point, 2) a low redox character, 3) a small amount of a Brønsted acid site or a Lewis acid site, 4) slow $NH_3$-SCR at a low temperature (Reaction Formula (3)), 5) an insufficient resistance against poisoning of the catalyst surface by $SO_2$ included in an exhaust gas, 6) an insufficient resistance against poisoning of the catalyst surface by ammonium sulfate (AS; $(NH_4)_2SO_4$) or ammonium bisulfate (ABS; $(NH_4)HSO_4$) produced during $NH_3$-SCR based on chemical reactions expressed by Reaction Formulas (4) to (6), 7) an insufficient resistance against an alkaline compound included in the exhaust gas, 8) lack of structural stability of the V oxide active site or a support at a high temperature, and 9) an insufficient resistance against hydrothermal aging. For example, compared to the commercial catalyst, $Cu_3V_2O_8$ and $Fe_2V_4O_{13}$ may solve at least one of the problems 1) to 7), and $ErVO_4$ and $TbVO_4$ may solve at least one of the problems 8) and 9).

$$NO+NO_2+2NH_3 \rightarrow 2N_2+3H_2O \quad (3)$$

$$SO_2+\tfrac{1}{2}O_2 \rightarrow SO_3 \quad (4)$$

$$SO_3+2NH_3+H_2O \rightarrow (NH_4)_2SO_4 \quad (5)$$

$$SO_3+NH_3+H_2O \rightarrow (NH_4)HSO_4 \quad (6)$$

However, despite of various advantages of the metal vanadates as an active site of a catalyst, a method capable of decomposing AS and ABS poisoning the catalyst surface, at a low temperature has not been found.

SUMMARY

The present invention provides a heterogeneous catalyst for selective catalytic reduction of $NO_X$ by $NH_3$ ($NH_3$-SCR), the catalyst having an excellent catalytic character compared to a commercial catalyst and using, as an active site, one of or a mixture of two or more of metal vanadates synthesizable at low costs, and a method of synthesizing the same. The present invention also provides a method of synthesizing a heterogeneous catalyst for $NH_3$-SCR, the catalyst 1) including at least one metal vanadate as an active site, and 2) being capable of decomposing ammonium sulfate (AS; $(NH_4)_2SO_4$) and ammonium bisulfate (ABS; $(NH_4)HSO_4$) produced during $NH_3$-SCR to poison the catalyst surface, at a low temperature. However, the scope of the present invention is not limited thereto.

According to an aspect of the present invention, there is provided a nitrogen oxide ($NO_X$) reduction catalyst including an active site including at least one of a metal vanadate expressed by [Chemical Formula 1] and a metal vanadate expressed by [Chemical Formula 2], and a support for loading the active site thereon.

$$(M_1)_XV_2O_{X+5} \quad \text{[Chemical Formula 1]}$$

(where $M_1$ denotes one selected from among manganese (Mn), cobalt (Co), and nickel (Ni), and X denotes a real number having a value between 1 and 3.)

$$(M_2)_YVO_4 \quad \text{[Chemical Formula 2]}$$

(where $M_2$ denotes one selected from among lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu), and Y denotes a real number having a value between 0.5 and 1.5.)

According to another aspect of the present invention, there is provided a nitrogen oxide ($NO_X$) reduction catalyst including a first active site including a metal vanadate expressed by [Chemical Formula 1], a second active site including a metal vanadate expressed by [Chemical Formula 2], and a support for loading both of the first and second active sites thereon.

$$(M_1)_XV_2O_{X+5} \quad \text{[Chemical Formula 1]}$$

(where $M_1$ denotes one selected from among manganese (Mn), cobalt (Co), and nickel (Ni), and X denotes a real number having a value between 1 and 3.)

$$(M_2)_YVO_4 \quad \text{[Chemical Formula 2]}$$

(where $M_2$ denotes one selected from among lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu), and Y denotes a real number having a value between 0.5 and 1.5.)

According to another aspect of the present invention, there is provided a nitrogen oxide (NO$_X$) reduction catalyst configured as a mixture of a first catalyst including a first active site including a metal vanadate expressed by [Chemical Formula 1], and a support for loading the first active site thereon, and a second catalyst including a second active site including a metal vanadate expressed by [Chemical Formula 2], and a support for loading the second active site thereon.

$(M_1)_XV_2O_{X+5}$       [Chemical Formula 1]

(where $M_1$ denotes one selected from among manganese (Mn), cobalt (Co), and nickel (Ni), and X denotes a real number having a value between 1 and 3.)

$(M_2)_YVO_4$       [Chemical Formula 2]

(where $M_2$ denotes one selected from among lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu), and Y denotes a real number having a value between 0.5 and 1.5.)

The support may include oxide of a Group-15 or Group-16 element as a promoter, and the promoter may have a composition range of 1 wt % to 5 wt % based on the total weight of the support, or have a composition range of 0.5 wt % to 3 wt % based on a total weight of the NO$_X$ reduction catalyst.

The Group-15 or Group-16 element may include at least one selected from the group consisting of or a combination of nitrogen (N), phosphorus (P), sulfur (S), arsenic (As), selenium (Se), antimony (Sb), tellurium (Te), bismuth (Bi), polonium (Po), moscovium (Mc), and livermorium (Lv).

At least a part of a surface of the NO$_X$ reduction catalyst may be sulfated.

The support may include one of carbon (C), $Al_2O_3$, MgO, $ZrO_2$, $CeO_2$, $TiO_2$, and $SiO_2$.

The metal vanadate expressed by [Chemical Formula 1] or the metal vanadate expressed by [Chemical Formula 2] may be included by $10^{-4}$ parts by weight to 50 parts by weight based on 100 parts by weight of the support.

The support may have a porous structure.

According to another aspect of the present invention, there is provided a method of synthesizing a nitrogen oxide (NO$_X$) reduction catalyst.

The method includes preparing a mixture solution by mixing a vanadium (V) precursor solution and a metal precursor solution, adding the mixture solution with a material used for a support, and synthesizing a catalyst including a support having loaded thereon a metal vanadate expressed by [Chemical Formula 1] and serving as an active site, and/or a metal vanadate expressed by [Chemical Formula 2] and serving as an active site, by obtaining a solid from the mixture solution and calcining the solid.

The metal precursor solution may include a solution having dissolved therein one selected among manganese (Mn) salt, cobalt (Co) salt, and nickel (Ni) salt, or a solution having dissolved therein one selected among lanthanum (La) salt, cerium (Ce) salt, praseodymium (Pr) salt, neodymium (Nd) salt, promethium (Pm) salt, samarium (Sm) salt, europium (Eu) salt, gadolinium (Gd) salt, terbium (Tb) salt, dysprosium (Dy) salt, holmium (Ho) salt, erbium (Er) salt, thulium (Tm) salt, ytterbium (Yb) salt, and lutetium (Lu) salt.

According to another aspect of the present invention, there is provided a method of synthesizing a nitrogen oxide (NO$_X$) reduction catalyst, the method including preparing a mixture solution by mixing a vanadium (V) precursor solution, a first metal precursor solution, and a second metal precursor solution, adding the mixture solution with a material used for a support, and synthesizing a catalyst including a support having loaded thereon a metal vanadate expressed by [Chemical Formula 1] and serving as a first active site, and a metal vanadate expressed by [Chemical Formula 2] and serving as a second active site, by obtaining a solid from the mixture solution and calcining the solid.

The first metal precursor solution may include a solution having dissolved therein one selected among manganese (Mn) salt, cobalt (Co) salt, and nickel (Ni) salt, and the second metal precursor solution may include a solution having dissolved therein one selected among lanthanum (La) salt, cerium (Ce) salt, praseodymium (Pr) salt, neodymium (Nd) salt, promethium (Pm) salt, samarium (Sm) salt, europium (Eu) salt, gadolinium (Gd) salt, terbium (Tb) salt, dysprosium (Dy) salt, holmium (Ho) salt, erbium (Er) salt, thulium (Tm) salt, ytterbium (Yb) salt, and lutetium (Lu) salt.

The method may further include sulfating the solid after the solid is obtained and calcined.

The method may further include mixing the catalyst including the support having loaded thereon the metal vanadate expressed by [Chemical Formula 1], with the catalyst including the support having loaded thereon the metal vanadate expressed by [Chemical Formula 2].

The V precursor solution may include a solution having dissolved therein at least one of $NH_4VO_3$, $NaVO_3$, $VCl_2$, $VCl_3$, $VBr_3$, $VCl_3 \cdot 3C_4H_8O$, $VO(C_5H_7O_2)_2$, $VO(OC_2H_5)_3$, $VC_{10}H_{10}Cl_2$, $VC_{18}H_{14}I$, $VOCl_3$, $VOF_3$, $VO(OCH(CH_3)_2)_3$, $V(C_5H_7O_2)_3$, $VOSO_4$, and $V(C_5H_5)_2$.

The Mn salt may include at least one of $Mn(NO_3)_2$, $MnSO_4$, $MnI_2$, $Mn(C_{11}H_{19}O_2)_3$, $MnCl_2$, $C_{10}H_{14}MnO_4$, $Mn(C_5H_7O_2)_3$, $Mn(CH_3COO)_2$, $Mn(CH_3COO)_3$, $Mn(CH_3CO_2)_2$, $Mn[CH_3COCH=C(O)CH_3]_2$, $Mn(ClO_4)_2$, $MnF_3$, $Mn_2(CO)_{10}$, $MnC_{32}H_{16}N_8$, $MnC_2F_6O_6S_2$, $MnCO_3$, $MnBr_2$, $Li_2MnCl_4$, $MnF_2$, $MnC_{32}H_{16}ClN_8$, $Mn(HCO_2)_2$ $Mn.XH_2O$, $Mn[C_6H_{11}(CH_2)_3CO_2]_2$, $MnC_{16}H_{22}$, $MnC_{18}H_{26}$, $Mn_2C_{10}O_{10}$, $MnC_3H_9O_{12}S_3$, and $KMnO_4$.

The Co salt may include at least one of $Co(NO_3)_2$, $CoBr_2$, $CoCl_2$, $Co(CH_3CO_2)_2$, $CO_2(CO)_8$, $Co(C_5H_7O_2)_3$, $CoSO_4$, $[Co(NH_3)_6]Cl_3$, $CoF_2$, $CoF_3$, $CoCO_3$, $Co_3(PO_4)_2$, $Co(ClO_4)_2$, $Co(BF_4)_2$, $Co(SCN)_2$, $Co(OH)_2$, $Co(NH_4)_2(SO_4)_2$, $CoC_5H_5(CO)_2$, $CoC_2O_4$, $Co(CN)_2$, $Co(C_5H_7O_2)_2$, $Co(C_5HF_6O_2)_2$, $Co(C_5H_5)_2$, $CoC_{20}H_{30}Co$, $Co(H_2NCH_2CH_2NH_2)_3Cl_3$, and $[Co(NH_3)_6]Cl_3$.

The Ni salt may include at least one of $Ni(NO_3)_2$, $NiI_2$, $NiCl_2$, $Ni(OCOCH_3)_2$, $NiSO_4$, $NiO_2 \cdot XH_2O$, $Ni(C_5H_7O_2)_2$, $Ni(ClO_4)_2$, $NiBr_2$, $Ni(OH)_2$, $NiBr_2$, $Ni(NH_4)_2(SO_4)_2$, $NiCO_3 \cdot 2Ni(OH)_2$, $2NiCO_3 \cdot 3Ni(OH)_2$, $NiF_2$, and $Ni[CH_3(CH_2)_6CO_2]_2$.

The La salt may include at least one of $LaF_3$, $LaB_6$, $LaCl_3$, $La(CH_3CO_2)_3$, $LaI_3$, $La_2(C_2O_4)_3$, $La(CF_3SO_3)_3$, $La(NO_3)_3$, $La(C_9H_{21}O_3)$, $La(C_5H_7O_2)_3$, $LaBr_3$, $LaPO_4$, $La_2(CO_3)_3$, $La(OH)_3$, and $La_2(SO_4)_3$.

The Ce salt may include at least one of $CeF_3$, $Ce(NH_4)_2(NO_3)_6$, $CeF_4$, $CeCl_3$, $Ce(CH_3CO_2)_3$, $CeI_3$, $Ce(SO_4)_2$, $Ce_2(C_2O_4)_3$, $Ce(NO_3)_3$, $Ce(C_5H_7O_2)_3$, $CeBr_3$, $Ce_2(CO_3)_3$, $Ce(OH)_4$, $Ce(NH_4)_4(SO_4)_4$, and $Ce_2(SO_4)_3$.

The Pr salt may include at least one of $PrCl_3$, $Pr(NO_3)_3$, $PrCl_3$, $Pr(C_5H_7O_2)_3$, and $Pr_2(SO_4)_3$.

The Nd salt may include at least one of NdF$_3$, NdCl$_3$, Nd(NO$_3$)$_3$, Nd(CH$_3$CO$_2$)$_3$, NdCl$_3$, Nd(NO$_3$)$_3$, and Nd$_2$(SO$_4$)$_3$.

The Sm salt may include at least one of Sm$_{12}$, Sm$_{13}$, SmCl$_3$, Sm(NO$_3$)$_3$, Sm(CH$_3$CO$_2$)$_3$, SmPO$_4$, Sm(C$_9$H$_{21}$O$_3$), Sm$_2$(SO$_4$)$_3$, and Sm(C$_5$H$_7$O$_2$)$_3$.

The Eu salt may include at least one of EuI$_2$, EuF$_3$, EuBr$_2$, EuBr$_3$, EuCl$_2$, EuCl$_3$, Eu(NO$_3$)$_3$, Eu(CH$_3$CO$_2$)$_3$, Eu(C$_5$H$_7$O$_2$)$_3$, and Eu$_2$(SO$_4$)$_3$.

The Gd salt may include at least one of GdCl$_3$, GdF$_3$, GdCl$_3$, Gd(NO$_3$)$_3$, Gd(CH$_3$CO$_2$)$_3$, Gd(C$_5$H$_7$O$_2$)$_3$, Gd$_2$(SO$_4$)$_3$, Gd(C$_5$H$_7$O$_2$)$_3$, and Gd(OH)$_3$.

The Tb salt may include at least one of TbCl$_3$, TbF$_3$, Tb(NO$_3$)$_3$, Tb(CH$_3$CO$_2$)$_3$, Tb(C$_5$H$_7$O$_2$)$_3$, and Tb$_2$(SO$_4$)$_3$.

The Dy salt may include at least one of DyF$_3$, DyCl$_2$, Dy(NO$_3$)$_3$, DyCl$_3$, and Dy(CH$_3$CO$_2$)$_3$.

The Ho salt may include at least one of HoCl$_3$, HoBr$_3$, HoF$_3$, Ho(NO$_3$)$_3$, Ho(ClO$_4$)$_3$, and Ho(CH$_3$CO$_2$)$_3$.

The Er salt may include at least one of ErF$_3$, ErCl$_3$, ErBr$_3$, and Er(NO$_3$)$_3$.

The thulium salt may include at least one of TmI$_2$, TmBr$_3$, TmF$_3$, TmCl$_3$, Tm(NO$_3$)$_3$, Tm(CH$_3$CO$_2$)$_3$, Tm$_2$(CO$_3$)$_3$, and Tm$_2$(SO$_4$)$_3$.

The Yb salt may include at least one of YbCl$_3$, YbF$_3$, YbI$_2$, Yb(NO$_3$)$_3$, Yb(CH$_3$CO$_2$)$_3$, and Yb(C$_9$H$_{21}$O$_3$).

The Lu salt may include at least one of LuCl$_3$, Lu(CH$_3$CO$_2$)$_3$, LuF$_3$, LuCl$_3$, Lu(NO$_3$)$_3$, and Lu(C$_5$H$_7$O$_2$)$_3$.

BRIEF DESCRIPTION OF THE DRAWINGS

The above and other features and advantages of the present invention will become more apparent by describing in detail embodiments thereof with reference to the attached drawings in which.

DETAILED DESCRIPTION

Figures 1A, 1B, 1C:
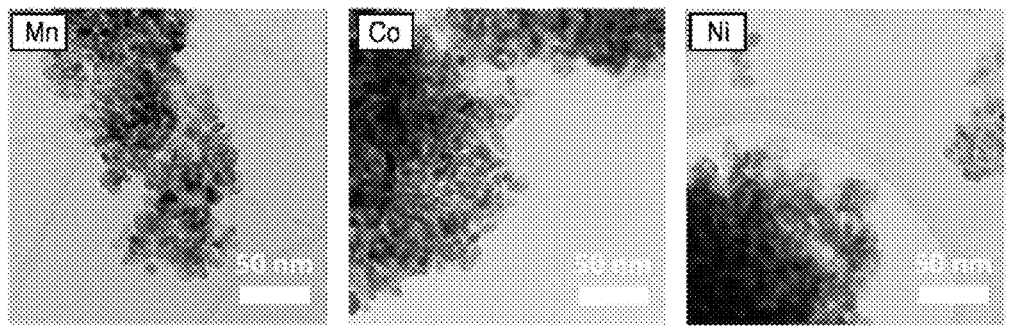
FIGS. 1A to 1C are high-resolution transmission electron microscopy (HRTEM) images of catalysts synthesized according to Embodiments 1 to 3 of the present invention.

The following detailed descriptions of the invention will be made with reference to the accompanying drawings illustrating specific embodiments of the invention by way of example. These embodiments will be described in detail such that the invention can be carried out by one of ordinary skill in the art. It should be understood that various embodiments of the invention are different, but are not necessarily mutually exclusive.

For example, a specific shape, structure, and characteristic of an embodiment described herein may be implemented in another embodiment without departing from the scope of the invention. In addition, it should be understood that a position or placement of each component in each disclosed embodiment may be changed without departing from the scope of the invention. Accordingly, there is no intent to limit the invention to the following detailed descriptions. The scope of the invention is defined by the appended claims and encompasses all equivalents that fall within the scope of the appended claims. In the drawings, like reference numerals denote like functions, and the sizes of elements may be exaggerated for convenience of explanation.

Hereinafter, to allow one of ordinary skill in the art to easily carry out the invention, embodiments of the present invention will be described in detail with reference to the accompanying drawings.

A nitrogen oxide (NO$_X$) reduction catalyst according to an embodiment of the present invention includes an active site corresponding to a region onto which a reactant is adsorbed and from which a product is detached after reaction, and a support for loading the active site thereon.

A NO$_X$ reduction catalyst according to a first embodiment of the present invention includes a metal vanadate (or a composite oxide of vanadium (V)) including one metal selected from among manganese (Mn), cobalt (Co), and nickel (Ni), and V, and expressed by [Chemical Formula 1], as an active site. Such a metal vanadate is called a "metal vanadate A".

$(M_1)_X V_2 O_{X+5}$      [Chemical Formula 1]

(where $M_1$ denotes one selected from among Mn, Co, and Ni, and X denotes a real number having a value between 1 and 3.)

For example, the metal vanadate A includes at least one selected from among MnV$_2$O$_6$, Mn$_2$V$_2$O$_7$, Mn$_3$V$_2$O$_8$, CoV$_2$O$_6$, Co$_2$V$_2$O$_7$, Co$_3$V$_2$O$_8$, NiV$_2$O$_6$, Ni$_2$V$_2$O$_7$, and Ni$_3$V$_2$O$_8$.

The metal vanadate A used as the active site may be synthesized in various ways by adjusting stoichiometry of $M_1$ (e.g., Mn, Co, or Ni) and V.

A NO$_X$ reduction catalyst according to a second embodiment of the present invention includes a metal vanadate (or a composite oxide of V) including one metal selected from among lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu), and V, and expressed by [Chemical Formula 2], as an active site. Such a metal vanadate is called a "metal vanadate B".

$(M_2)_Y VO_4$      [Chemical Formula 2]

(where $M_2$ denotes one selected from among La, Ce, Pr, Nd, Pm, Sm, Eu, Gd, Tb, Dy, Ho, Er, Tm, Yb, and Lu, and Y denotes a real number having a value between 0.5 and 1.5.)

For example, the metal vanadate B may include at least one selected from among LaVO$_4$, CeVO$_4$, PrVO$_4$, NdVO$_4$, PmVO$_4$, SmVO$_4$, EuVO$_4$, GdVO$_4$, TbVO$_4$, DyVO$_4$, HoVO$_4$, ErVO$_4$, TmVO$_4$, YbVO$_4$, and LuVO$_4$.

The metal vanadate B used as the active site may be synthesized based on 1:1 stoichiometry of $M_2$ (e.g., La, Ce, Pr, Nd, Pm, Sm, Eu, Gd, Tb, Dy, Ho, Er, Tm, or Yb) and V.

However, to increase a metal or V site which is coordinatively unsaturated and thus is capable of desirably interacting with $NO_X$, $NH_3$, ammonium sulfate (AS; $(NH_4)_2SO_4$), or ammonium bisulfate (ABS; $(NH_4)HSO_4$), the metal vanadate B may be synthesized in such a manner that the stoichiometry of $M_2$:V has a range between 0.5:1 and 1.5:1.

According to an embodiment of the present invention, the active site substantially includes only a metal vanadate. For example, at least 90 wt % of the material of the active site may be the metal vanadate. Specifically, the metal vanadate may be included by at least 95 wt %, and more desirably, by at least 99 wt %, and the remnant may include a material unavoidable in a synthesis process.

Since the active site includes a composite oxide of V and one of metals, an excellent catalytic character is achieved compared to a case in which V oxide and another metal oxide (e.g., Mn oxide, Co oxide, Ni oxide, Yb oxide, or Ce oxide) are present as different materials.

A $NO_X$ reduction catalyst according to a third embodiment of the present invention includes a mixture of a first catalyst including a first active site including at least one metal vanadate A, and a support for loading the first active site thereon, and a second catalyst including a second active site including at least one metal vanadate B, and a support for loading the second active site thereon.

The first catalyst including the metal vanadate A as an active site may achieve an excellent catalytic character at a low temperature equal to or lower than 300° C. On the contrary, the second catalyst including the metal vanadate B as an active site may achieve an excellent catalytic character at a temperature equal to or higher than 300° C.

Therefore, when a mixture of the first catalyst and the second catalyst at an appropriate ratio is used as a catalyst, the catalyst may efficiently operate in a wide temperature range from a low temperature to a high temperature.

A mixing ratio of the mixed catalyst according to the third embodiment may be variously changed depending on an environment (e.g., a temperature or an atmosphere) or a purpose of application of the catalyst. For example, a weight ratio of the second catalyst to the first catalyst may vary within a range from 0.1:99.9 to 99.1:0.1.

A $NO_X$ reduction catalyst according to a fourth embodiment of the present invention has a structure in which a first active site including at least one metal vanadate A and a second active site including at least one metal vanadate B are both loaded on one support.

Differently from the third embodiment in which the first and second catalysts respectively including the first and second active sites loaded on different supports are mixed, according to the fourth embodiment, heterogeneous metal vanadates belonging to different groups are loaded on one support as active sites.

Similarly to the catalyst according to the third embodiment, the $NO_X$ reduction catalyst according to the fourth embodiment may efficiently operate in a wide temperature range from a low temperature to a high temperature because the first active site having an excellent high-temperature character and the second active site having an excellent low-temperature character are both loaded on one support.

The first and second active sites may be randomly distributed in the support, and a relative weight ratio of the second active site to the first active site may vary within a range from 0.1:99.9 to 99.1:0.1.

The above-described metal vanadate according to an embodiment of the present invention may be prepared using various methods. For example, the metal vanadate may be synthesized using one or more of hydrothermal synthesis, solvothermal synthesis, a mechano-chemical method (e.g., ball-milling), non-templated or templated synthesis, a wet or dry impregnation method, and a thermal decomposition method using a Mn—V, Co—V, or Ni—V based complex).

The metal vanadate may be dispersed in a porous support to be described below, and may have a diameter (maximum diameter) of 0.1 nm to 500 μm. In this case, the metal vanadate may have a composition range of $10^{-4}$ parts by weight to 50 parts by weight based on 100 parts by weight of the support.

The above-described $NO_X$ reduction catalyst according to an embodiment of the present invention may further include a promoter. The active site of the $NO_X$ reduction catalyst needs to have a low activity in adsorption and oxidation reaction of sulfur dioxide ($SO_2$) included in a flue gas. Ammonia ($NH_3$) serving as a reducing agent may react with sulfur trioxide ($SO_3$) based on Chemical Reaction Formulas (3) to (5) to produce AS (or ABS) on the catalyst surface, and AS may be irreversibly adsorbed onto the active site of the catalyst at a low temperature equal to or lower than 300° C. Adsorbed AS may reduce the activity of the catalyst by hindering adsorption of $NO_X$ and the reducing agent, e.g., $NH_3$. $SO_3$ produced due to oxidation of $SO_2$ may be bond to water vapor included in the flue gas, to produce sulfuric acid ($H_2SO_4$) and corrode a rear-end system of a selective catalytic reduction (SCR) process.

$$SO_2 + \tfrac{1}{2}O_2 \rightarrow SO_3 \tag{3}$$

$$SO_3 + 2NH_3 + H_2O \rightarrow (NH_4)_2SO_4 \tag{4}$$

$$SO_3 + NH_3 + H_2O \rightarrow (NH_4)HSO_4 \tag{5}$$

The promoter may serve to increase a resistance against poisoning by $SO_2$ or the AS during catalytic reaction. For example, the promoter may reduce binding energy between $SO_2$ and the surface of the catalyst. As such, oxidation reaction of $SO_2$ (Reaction Formula (3)), which may occur during low-temperature SCR, may be minimized. Furthermore, the promoter may minimize the amount of AS (Reaction Formula (4)) or ABS (Reaction Formula (5)) adsorbed onto the catalyst surface due to reaction between $SO_2$ and $NH_3$ and thus prevent a reduction in activity of the catalyst due to poisoning of the catalyst surface. In addition, the promoter may be added as an element of the catalyst surface, which is capable of decomposing AS or ABS at a low temperature.

The promoter includes oxide of a Group-15 or Group-16 element. The Group-15 or Group-16 element may include at least one selected from the group consisting of or a combination of nitrogen (N), phosphorus (P), sulfur (S), arsenic (As), selenium (Se), antimony (Sb), tellurium (Te), bismuth (Bi), polonium (Po), moscovium (Mc), and livermorium (Lv).

The promoter may be included by $10^{-4}$ parts by weight to 50 parts by weight based on 100 parts by weight of the support. Specifically, the promoter may be included by 3 parts by weight or less, and more desirably, by 0.5 parts by weight to 2 parts by weight.

The support serves to disperse and load the metal vanadate and the promoter thereon. The active site of the catalyst needs to have a high redox character for appropriate adsorption and conversion of $NO_X$. In this case, when the catalyst is synthesized by dispersing the metal vanadate in an appropriate support, reactive oxygen ($O_2$) species in the support may be appropriately supplied to the active site. That is, the redox character of the catalyst may be improved. At the same time, when the catalyst is synthesized by highly dispersing the metal vanadate in the support, catalyst efficiency may be further improved. Therefore, a $NO_X$ reduction catalyst including a support having a character capable of providing the above environment may be synthesized.

The support may include carbon (C) or metal oxide. The metal oxide may be one selected from among $Al_2O_3$, MgO, $ZrO_2$, $CeO_2$, $TiO_2$, and $SiO_2$.

The $NO_X$ reduction catalyst according to an embodiment of the present invention may have a morphological character of a large surface area. The larger the surface area, the faster adsorption of a reactant (e.g., $NO_X$ or $NH_3$) and the higher a reaction rate. As such, $NO_X$ reduction efficiency may be improved. To ensure a large surface area, the catalyst may have a porous structure. For example, a porous structure having a large surface area may be implemented by configuring the support as aggregates obtained by calcining a powder material.

The $NO_X$ reduction catalyst according to an embodiment of the present invention may be functionalized by sulfating the surface thereof. The sulfation process according to the present invention refers to functionalization of the catalyst with $SO_Y^{2-}$. In this specification, "functionalization" may refer to a process for improving performance of a catalyst by increasing the number of active sites of the catalyst or improving, for example, a reactant-catalyst adsorption character. For example, when the $NO_X$ reduction catalyst of the present invention is sulfated and is functionalized with $SO_Y^{2-}$, the catalyst surface may become advantageous for adsorption and conversion of $NO_X$, and new active sites may be created.

An S—O binding character in $SO_Y^{2-}$ species bound to metal species on the catalyst surface may be adjusted based on functionalization with $SO_Y^{2-}$ by sulfating the surface. Specifically, the $SO_Y^{2-}$ species on the catalyst surface are bound to the metal species of the catalyst in the form of bi-dentate binding when they have an ionic character, and are bound to the metal species of the catalyst in the form of mono-dentate binding when they have a covalent character. Selective catalytic reduction of $NO_X$ by $NH_3$ ($NH_3$-SCR) performance of the catalyst may depend on distribution of the binding types on the catalyst.

In this case, according to an embodiment of the present invention, the sulfation process may be performed using a reaction gas including $SO_2$ and $O2$. The reaction gas may have a concentration of $SO_2$ and $O2$ ranging from 10 ppm to $10^5$ ppm, a flow rate ranging from $10^{-5}$ mL min$^{-1}$ to $10^5$ mL min$^{-1}$, and a pressure ranging from $10^{-5}$ bar to $10^5$ bar. The sulfation process may be performed in a temperature range from 200° C. to 800° C. for 0.1 hour to 24 hours.

When conditions for the sulfation process of the catalyst do not reach the above-described ranges, the $SO_Y^{2-}$ functionalization effect of the catalyst may be insufficient. Otherwise, when the conditions exceed the above-described ranges, oxygen species ($O_\alpha$) for improving a redox character of the catalyst surface during $NH_3$-SCR or improving $NO_2$ production efficiency for fast $NH_3$-SCR of Reaction Formula (7) may be eliminated due to excessive functionalization of the support surface. Therefore, the sulfation process of the catalyst may be performed within the above-described condition ranges.

$$NO+NO_2+2NH_3 \rightarrow 2N_2+3H_2O \qquad (7)$$

The catalyst modified due to the sulfation and $SO_Y^{2-}$ functionalization process additionally produce $SO_Y^{2-}$—$NH_4$ species. The $SO_Y^{2-}$—$NH_4$ species serve as a Bronsted acid site capable of adsorbing the reducing agent, e.g., $NH_3$. That is, the sulfated and functionalized catalyst according to the present invention may increase the number of reaction active sites compared to a non-functionalized catalyst. Furthermore, the catalyst modified due to functionalization with $SO_Y^{2-}$ may additionally produce metal-$SO_Y^{2-}$ species and thus improve an oxidation/reduction character compared to a non-functionalized catalyst. In addition, the metal-$SO_Y^{2-}$ species may improve $NO_2$ production efficiency for fast $NH_3$-SCR of Reaction Formula (7).

That is, the number of acid sites may be adjusted or a binding strength between reactants (e.g., $NO_X$ and $NH_3$) and poisoning materials (e.g., AS and ABS) may be adjusted based on $SO_Y^{2-}$ (Y-3 or 4) functionalization conditions. Therefore, when an optimal metal vanadate for $NH_3$-SCR is synthesized, during $NH_3$-SCR, 1) a plurality of Brønsted acid sites may be provided, 2) a plurality of coordinatively unsaturated Lewis acid sites may be provided, 3) an optimal reaction strength with reactants desirable for efficient execution of a $NO_X$ turnover cycle may be provided, 4) NO oxidation efficiency desirable for fast SCR may be implemented, and 5) an element of the catalyst surface, which is capable of decomposing the poisoning materials (e.g., AS and ABS) of the catalyst surface at a low temperature, may be provided.

Even when poisoned by AS or ABS produced during catalytic reaction, the $NO_X$ reduction catalyst according to an embodiment of the present invention may decompose AS or ABS at a low temperature lower than 300° C. and thus may achieve an excellent regeneration effect for recovering a catalytic character to that before being poisoned, compared to general catalysts. That is, after being poisoned by AS or ABS produced during reduction of $NO_X$, even when a regeneration process is performed in an oxygen and nitrogen atmosphere, the general catalysts may not easily recover catalytic characters to those before being poisoned. However, in the $NO_X$ reduction catalyst according to an embodiment of the present invention, even after being poisoned by AS or ABS, when a regeneration process is performed in an oxygen and nitrogen atmosphere at a temperature lower than 300° C., AS or ABS is decomposed and the catalytic character is recovered. This means that the $NO_X$ reduction catalyst of the present invention may be reused without replacement by merely performing a regeneration process after the catalyst operates for a certain time, and thus a life span of the catalyst may be remarkably increased.

A method of synthesizing a $NO_X$ reduction catalyst, according to an embodiment of the present invention, will now be described.

A method of synthesizing a $NO_X$ reduction catalyst, according to a first embodiment of the present invention, may include the following operations.

Initially, a V precursor solution and a metal precursor solution A including a metal selected from among Mn, Co, and Ni are prepared.

The V precursor solution may be, for example, a solution obtained by dissolving a V compound in a solvent. The V compound includes, for example, $NH_4VO_3$, $NaVO_3$, $VCl_2$, $VCl_3$, $VBr_3$, $VCl_3 \cdot 3C_4H_8O$, $VO(C_5H_7O_2)_2$, $VO(OC_2H_5)_3$, $VC_{10}H_{10}Cl_2$, $VC_{18}H_{14}I$, $VOCl_3$, $VOF_3$, $VO(OCH(CH_3)_2)_3$, $V(C_5H_7O_2)_3$, $VOSO_4$, or $V(C_5H_5)_2$.

The metal precursor solution A is used to provide one of Mn, Co, and Ni used for the catalyst, and may be a solution obtained by dissolving one of Mn salt, Co salt, and Ni salt in a solvent.

The Mn salt may include, for example, $Mn(NO_3)_2$, $MnSO_4$, $MnI_2$, $Mn(C_{11}H_{19}O_2)_3$, $MnCl_2$, $C_{10}H_{14}MnO_4$, $Mn(C_5H_7O_2)_3$, $Mn(CH_3COO)_2$, $Mn(CH_3COO)_3$, $Mn(CH_3CO_2)_2$, $Mn[CH_3COCH=C(O)CH_3]_2$, $Mn(ClO_4)_2$, $MnF_3$, $Mn_2(CO)_{10}$, $MnC_{32}H_{16}N_8$, $MnC_2F_6O_6S_2$, $MnCO_3$, $MnBr_2$, $Li_2MnCl_4$, $MnF_2$, $MnC_{32}H_{16}ClN_8$, $Mn(HCO_2)_2$ $Mn \cdot XH_2O$, $Mn[C_6H_{11}(CH_2)_3CO_2]_2$, $MnC_{16}H_{22}$, $MnC_{18}H_{26}$, $Mn_2C_{10}O_{10}$, $MnC_3H_9O_{12}S_3$, or $KMnO_4$.

The Co salt may include, for example, $Co(NO_3)_2$, $CoBr_2$, $CoCl_2$, $Co(CH_3CO_2)_2$, $Co_2(CO)_8$, $Co(C_6H_7O_2)_3$, $CoSO_4$,

[Co(NH$_3$)$_6$]Cl$_3$, COF$_2$, COF$_3$, CoCO$_3$, CO$_3$(PO$_4$)$_2$, CO(ClO$_4$)$_2$, CO(BF$_4$)$_2$, CO(SCN)$_2$, CO(OH)$_2$, CO(NH$_4$)$_2$(SO$_4$)$_2$, CoC$_5$H$_5$(CO)$_2$, CoC$_2$O$_4$, Co(CN)$_2$, CO(C$_5$H$_7$O$_2$)$_2$, CO(C$_5$HF$_6$O$_2$)$_2$, Co(C$_5$H$_5$)$_2$, CoC$_{20}$H$_{30}$Co, Co(H$_2$NCH$_2$CH$_2$NH$_2$)$_3$Cl$_3$, or [Co(NH$_3$)$_6$]Cl$_3$.

The Ni salt may include, for example, Ni(NO$_3$)$_2$, NiI$_2$, NiCl$_2$, Ni(OCOCH$_3$)$_2$, NiSO$_4$, NiO$_2$.XH$_2$O, Ni(C$_6$H$_7$O$_2$)$_2$, Ni(ClO$_4$)$_2$, NiBr$_2$, Ni(OH)$_2$, NiBr$_2$, Ni(NH$_4$)$_2$(SO$_4$)$_2$, NiCO$_3$.2Ni(OH)$_2$, 2NiCO$_3$.3Ni(OH)$_2$, NiF$_2$, or Ni[CH$_3$(CH$_2$)$_6$CO$_2$]$_2$.

Then, a mixture solution A is prepared by mixing the prepared V precursor solution and metal precursor solution A. The mixture solution A is added with a material used for a support, is sufficiently stirred, and then is dehydrated to obtain a solid including a single metal vanadate. A NO$_X$ reduction catalyst having the single metal vanadate dispersed therein may be synthesized by calcining the obtained solid.

A method of synthesizing a NO$_X$ reduction catalyst, according to a second embodiment of the present invention, may equal that of the first embodiment except that a different metal precursor solution is used. In the second embodiment, a metal precursor solution B to be mixed with the V precursor solution includes a metal selected from among La, Ce, Pr, Nd, Pm, Sm, Eu, Gd, Tb, Dy, Ho, Er, Tm, Yb, and Lu.

The metal precursor solution B is used to provide one of La, Ce, Pr, Nd, Pm, Sm, Eu, Gd, Tb, Dy, Ho, Er, Tm, Yb, and Lu used for the catalyst, and may be a solution obtained by dissolving one of La salt, Ce salt, Pr salt, Nd salt, Pm salt, Sm salt, Eu salt, Gd salt, Tb salt, Dy salt, Ho salt, Er salt, thulium salt, Yb salt, and Lu salt in a solvent.

The La salt may include, for example, LaF$_3$, LaB$_6$, LaCl$_3$, La(CH$_3$CO$_2$)$_3$, LaI$_3$, La$_2$(C$_2$O$_4$)$_3$, La(CF$_3$SO$_3$)$_3$, La(NO$_3$)$_3$, La(C$_9$H$_{21}$O$_3$), La(C$_5$H$_7$O$_2$)$_3$, LaBr$_3$, LaPO$_4$, La$_2$(CO$_3$)$_3$, La(OH)$_3$, or La$_2$(SO$_4$)$_3$.

The Ce salt may include, for example, CeF$_3$, Ce(NH$_4$)$_2$(NO$_3$)$_6$, CeF$_4$, CeCl$_3$, Ce(CH$_3$CO$_2$)$_3$, CeI$_3$, Ce(SO$_4$)$_2$, Ce$_2$(C$_2$O$_4$)$_3$, Ce(NO$_3$)$_3$, Ce(C$_6$H$_7$O$_2$)$_3$, CeBr$_3$, Ce$_2$(CO$_3$)$_3$, Ce(OH)$_4$, Ce(NH$_4$)$_4$(SO$_4$)$_4$, or Ce$_2$(SO$_4$)$_3$.

The Pr salt may include, for example, PrCl$_3$, Pr(NO$_3$)$_3$, PrCl$_3$, Pr(C$_5$H$_7$O$_2$)$_3$, or Pr$_2$(SO$_4$)$_3$.

The Nd salt may include, for example, NdF$_3$, NdCl$_3$, Nd(NO$_3$)$_3$, Nd(CH$_3$CO$_2$)$_3$, NdCl$_3$, Nd(NO$_3$)$_3$, or Nd$_2$(SO$_4$)$_3$.

The Sm salt may include, for example, Sm$_{12}$, SmI$_3$, SmCl$_3$, Sm(NO$_3$)$_3$, Sm(CH$_3$CO$_2$)$_3$, SmPO$_4$, Sm(C$_9$H$_{21}$O$_3$), Sm$_2$(SO$_4$)$_3$, or Sm(C$_5$H$_7$O$_2$)$_3$.

The Eu salt may include, for example, EuI$_2$, EuF$_3$, EuBr$_2$, EuBr$_3$, EuCl$_2$, EuCl$_3$, Eu(NO$_3$)$_3$, Eu(CH$_3$CO$_2$)$_3$, Eu(C$_5$H$_7$O$_2$)$_3$, or Eu$_2$(SO$_4$)$_3$.

The Gd salt may include, for example, GdCl$_3$, GdF$_3$, GdCl$_3$, Gd(NO$_3$)$_3$, Gd(CH$_3$CO$_2$)$_3$, Gd(C$_5$H$_7$O$_2$)$_3$, Gd$_2$(SO$_4$)$_3$, Gd(C$_5$H$_7$O$_2$)$_3$, or Gd(OH)$_3$.

The Tb salt may include, for example, TbCl$_3$, TbF$_3$, Tb(NO$_3$)$_3$, Tb(CH$_3$CO$_2$)$_3$, Tb(C$_5$H$_7$O$_2$)$_3$, or Tb$_2$(SO$_4$)$_3$.

The Dy salt may include, for example, DyF$_3$, DyCl$_2$, Dy(NO$_3$)$_3$, DyCl$_3$, or Dy(CH$_3$CO$_2$)$_3$.

The Ho salt may include, for example, HoCl$_3$, HoBr$_3$, HoF$_3$, Ho(NO$_3$)$_3$, Ho(ClO$_4$)$_3$, or Ho(CH$_3$CO$_2$)$_3$.

The Er salt may include, for example, ErF$_3$, ErCl$_3$, ErBr$_3$, or Er(NO$_3$)$_3$.

The Tm salt may include, for example, TmI$_2$, TmBr$_3$, TmF$_3$, TmCl$_3$, Tm(NO$_3$)$_3$, Tm(CH$_3$CO$_2$)$_3$, Tm$_2$(CO$_3$)$_3$, or Tm$_2$(SO$_4$)$_3$.

The Yb salt may include, for example, YbCl$_3$, YbF$_3$, YbI$_2$, Yb(NO$_3$)$_3$, Yb(CH$_3$CO$_2$)$_3$, or Yb(C$_9$H$_{21}$O$_3$).

The Lu salt may include, for example, LuCl$_3$, Lu(CH$_3$CO$_2$)$_3$, LuF$_3$, LuCl$_3$, Lu(NO$_3$)$_3$, or Lu(C$_5$H$_7$O$_2$)$_3$.

A method of synthesizing a NO$_X$ reduction catalyst, according to a third embodiment of the present invention, may include the following operations.

A mixture solution A is prepared by mixing a V precursor solution and a metal precursor solution A, and a mixture solution B is prepared by mixing the V precursor solution and a metal precursor solution B. The mixture solutions A and B are added with a material used for a support, are sufficiently stirred, and then are dehydrated to obtain a solid A and a solid B each including a single metal vanadate. A NO$_X$ reduction catalyst having the single metal vanadates dispersed therein may be synthesized by mechanically mixing and then calcining, or calcining and then mechanically mixing the obtained solids A and B.

A method of synthesizing a NO$_X$ reduction catalyst, according to a fourth embodiment of the present invention, may include the following operations.

A mixture solution is prepared by mixing a V precursor solution, a metal precursor solution A, and a metal precursor solution B. The mixture solution is added with a material used for a support, is sufficiently stirred, and then is dehydrated to obtain a solid. A NO$_X$ reduction catalyst having a mixture of single metal vanadates dispersed therein may be synthesized by calcining the obtained solid.

As another method, a mixture solution A is prepared by mixing a V precursor solution and a metal precursor solution A, and a mixture solution B is prepared by mixing the V precursor solution and a metal precursor solution B. The mixture solution A (or the mixture solution B) is added with a material used for a support, is sufficiently stirred, is added with the mixture solution B (or the mixture solution A), is sufficiently stirred, and then is dehydrated to obtain a solid. A NO$_X$ reduction catalyst having a mixture of single metal vanadates dispersed therein may be synthesized by calcining the obtained solid.

In the above-described methods, a promoter may be created in a catalyst by including a Group-15 or Group-16 element in a support to be added to a mixture solution. For example, the support including the promoter may be prepared by mixing powder of a material used for the support, with a solution in which a compound of the Group-15 or Group-16 element is dissolved, and then performing stirring, dehydration, and calcination processes.

After the catalyst is synthesized, a SO$_Y^{2-}$ functionalization process may be further performed to improve a catalytic character. The SO$_Y^{2-}$ functionalization process may be performed by exposing the surface of the catalyst to a process gas including SO$_2$ and O$_2$ under certain flow rate and pressure conditions. Table 1 shows condition ranges for SO$_Y^{2-}$ functionalization.

TABLE 1

| SO$_2$ content (ppm) | O$_2$ content (Vol %) | Pressure (bar) | Flow rate of process gas (mL min$^{-1}$) | Exposure time (h) | Process temperature (° C.) |
|---|---|---|---|---|---|
| 10 to 10$^5$ | 10$^{-5}$ to 90 | 10$^{-5}$ to 10$^5$ | 10$^{-5}$ to 10$^5$ | 0.1 to 24 | 200 to 800 |

When conditions for $SO_y^{2-}$ functionalization do not reach a temperature of 200° C., a time of 0.1 hour, 10 ppm of $SO_2$, $10^{-5}$ Vol % of $O_2$, a flow rate of $10^{-5}$ mL min$^{-1}$, or a pressure of $10^{-5}$ bar, the $SO_y^{2-}$ functionalization effect of the catalyst surface may be insufficient. Otherwise, when the conditions exceed a temperature of 800° C., a time of 24 hours, $10^5$ ppm of $SO_2$, 90 Vol % of $O_2$, a flow rate of $10^5$ mL min$^{-1}$, or a pressure of $10^5$ bar, oxygen species ($O_\alpha$) for increasing SCR activity may be eliminated due to excessive $SO_y^{2-}$ functionalization of the surface of the support. Therefore, the $SO_y^{2-}$ functionalization process of the catalyst surface may be performed within the above-described condition ranges.

In addition, to improve a character of the catalyst surface while the catalyst is being synthesized, the amount of a metal/V precursor added to a synthetic solution may be adjusted. Specifically, metal and V may be added to the synthetic solution to stoichiometrically have a range between 0.5:1 and 1.5:1.

Hereinafter, the present invention will be described in detail by explaining embodiments of the invention. The invention may, however, be embodied in many different forms and should not be construed as being limited to the embodiments set forth herein.

Embodiments 1 to 3: Synthesis of Mn, Co, and Ni Catalysts

Mixture solutions are prepared by mixing 170 mL of distilled water in which 2.3 mmol of $NH_4VO_3$ is dissolved, with 70 mL of distilled water in which 1.15 mmol of Mn salt (e.g., $Mn(NO_3)_2 \cdot 6H_2O$), Co salt (e.g., $Co(NO_3)_2 \cdot 6H_2O$), and Ni salt (e.g., $Ni(NO_3)_2 \cdot 6H_2O$) are dissolved, and then are stirred for 1 hour. After being completely stirred, the mixture solutions are added with 6 g of anatase $TiO_2$ powder, are stirred for 24 hours, and then are dehydrated. Catalysts of Embodiments 1, 2, and 3 are synthesized by calcining solids obtained after dehydration, at 500° C. for 5 hours. The catalysts of Embodiments 1, 2, and 3 are characterized in that $TiO_2$ supports having an anatase phase are used and $MnV_2O_6$, $CoV_2O_6$, and $NiV_2O_6$ are included in the supports as active sites. In the following description, for convenience of explanation, the catalysts of Embodiments 1, 2, and 3 are called a Mn catalyst, a Co catalyst, and a Ni catalyst, respectively.

Comparative Example 1: Synthesis of W Catalyst

A catalyst having a V content similar to that of the catalysts of Embodiments 1 to 3 and including tungsten (W) as an active site is synthesized as a comparative example. Specifically, 0.46 g of $NH_4VO_3$, 0.67 g of $(NH_4)_{10}(H_2W_{12}O_{42}) \cdot 4H_2O$, and 0.84 g of $C_2H_2O_4 \cdot 2H_2O$ are dissolved in 100 mL of distilled water, 9.3 g of anatase $TiO_2$ powder is added, and then stirring and dehydration processes are performed. Thereafter, a catalyst including W is synthesized by performing a calcination process at 500° C. for 5 hours. In the catalyst of Comparative Example 1, V oxide and W oxide serving as an active site are provided as a mechanical mixture of different materials. In the following description, for convenience of explanation, the catalyst of Comparative Example 1 is called a W catalyst.

Embodiments 4 to 6: Synthesis of Mn(S), Co(S), and Ni(S) Catalysts

The Mn, Co, and Ni catalysts synthesized according to Embodiments 1 to 3 are mounted in reactors, are exposed to $SO_2$ and $O_2$ diluted in nitrogen ($N_2$) and simultaneously supplied at a flow rate of 500 mLmin$^{-1}$, at atmospheric pressure at 500° C. for 45 minutes, and then are cooled to room temperature in a $N_2$ atmosphere. In the exposure process, the content of $SO_2$ is 500 ppm and the content of O2 is 3 vol %. For convenience of explanation, the catalysts of Embodiments 4 to 6, which are $SO_y^{2-}$-functionalized based on the above conditions, are called a Mn(S) catalyst, a Co(S) catalyst, and a Ni(S) catalyst, respectively.

Comparative Example 2: Synthesis of W(S)-A Catalyst

A catalyst of Comparative Example 2, which is synthesized by functionalizing the surface of the W catalyst of Comparative Example 1 with $SO_y^{2-}$ in the same manner as Embodiments 4 to 6, is called a W(S)-A catalyst.

Embodiments 7 to 9: Synthesis of Mn—Se, Mn—Se(S, 30), and Mn—Se(S,500) Catalysts To prepare $TiO_2$ including Se as a promoter, a $TiO_2$ support including 3 wt % of Se based on the total weight of $TiO_2$ is prepared by adding 48.5 g of $TiO_2$ to 500 mL of distilled water in which 4.19 g of $SeCl_4$ is dissolved (to include 1.5 g of Se), performing stirring and dehydration processes, and then performing a calcination process at 300° C. for 3 hours. A Mn catalyst including Se (called a Mn—Se catalyst, Embodiment 7) is synthesized by using 6 g of the support in the same manner as Embodiment 1 except that a calcination process is performed at 400° C. for 3 hours. The Mn—Se catalyst is mounted in a reactor, is exposed to $SO_2$ and $O_2$ diluted in $N_2$ and simultaneously supplied at a flow rate of 500 mLmin$^{-1}$, at atmospheric pressure at 400° C. for 45 minutes, and then is cooled to room temperature in a $N_2$ atmosphere. In the exposure process, the content of $SO_2$ is 30 ppm or 500 ppm and the content of O2 is 3 vol %. Catalysts synthesized by functionalizing the surface of the Mn—Se catalyst with $SO_y^{2-}$ by using 30 ppm and 500 ppm of $SO_2$ are called a Mn—Se(S,30) catalyst (Embodiment 8) and a Mn—Se(S,500) catalyst (Embodiment 9), respectively.

Embodiments 10 and 11: Synthesis of Mn—Se(S,500)-300 and Mn—Se(S,500)-500 Catalysts The Mn—Se catalyst of Embodiment 7 is mounted in a reactor, is exposed to $SO_2$ and O2 diluted in $N_2$ and simultaneously supplied at a flow rate of 500 mLmin$^{-1}$, at atmospheric pressure at 300° C. or 500° C. for 45 minutes, and then is cooled to room temperature in a $N_2$ atmosphere. In the exposure process, the content of $SO_2$ is 500 ppm and the content of O2 is 3 vol %. Catalysts synthesized by functionalizing the surface of the Mn—Se catalyst with $SO_y^{2-}$ at temperatures of 300° C. and 500° C. are called a Mn—Se(S,500)-300 (Embodiment 10) and a Mn—Se(S,500)-500 (Embodiment 11), respectively.

Embodiment 12: Synthesis of Mn—Se(S,500)-Na Catalyst

A Mn—Se(S,500)-Na catalyst is synthesized by intentionally poisoning the surface of the Mn—Se(S,500) catalyst of Embodiment 9 by supplying 60 mol % of sodium (Na) species based on a total molar mass of Mn, V, and Se included in the catalyst, to the catalyst surface. Specifically, the Mn—Se(S,500)-Na catalyst of Embodiment 12 is synthesized by calcining a solid obtained by mechanically mixing 1.5 g of the Mn—Se(S) catalyst with 0.07413 g of NaNO$_3$, at 400° C. for 3 hours.

Comparative Examples 3 and 4: Synthesis of W(S,30)-B and W(S,500)-B Catalysts

A catalyst synthesized by functionalizing the surface of the W catalyst of Comparative Example 1 with SO$_Y^{2-}$ in the same manner as Embodiment 8 or 9 is called as a W(S, XXX)-B catalyst. Specifically, a catalyst synthesized by functionalizing the surface of the W catalyst with SO$_Y^{2-}$ by using 30 ppm of SO$_2$ is called a W(S,30)-B catalyst (Comparative Example 3), and a catalyst synthesized by functionalizing the surface of the W catalyst with SO$_Y^{2-}$ by using 500 ppm of SO$_2$ is called a W(S,500)-B catalyst (Comparative Example 4).

Comparative Example 5: Synthesis of W(S,500)-B—Na Catalyst

A W(S,500)-B—Na catalyst of Comparative Example 5 is synthesized by poisoning the surface of the W(S,500)-B catalyst of Comparative Example 4 with Na in the same manner as Embodiment 12.

Embodiment 13: Synthesis of Yb Catalyst

A mixture solution is prepared by adding 50 mL of distilled water in which 1.96 mmol of NH$_4$VO$_3$ is dissolved, to 50 mL of distilled water in which 1.96 mmol of Yb (NO$_3$)$_3$.5H$_2$O is dissolved, and then is stirred for 2 hours by fixing a pH value at 8. After being completely stirred, the mixture solution is added with 4.56 g of anatase TiO$_2$ powder, is stirred for 18 hours, and then is dehydrated. A Yb catalyst of Embodiment 13, which includes TiO$_2$ as a support and includes YbVO$_4$ as an active site, is synthesized by calcining a solid obtained after dehydration, at 500° C. for 5 hours.

Embodiment 14: Synthesis of Mn/Yb Catalyst

A solid obtained by mechanically mixing 1.5 g of the Mn catalyst of Embodiment 1 including 2 wt % of V (active site: MnV$_2$O$_6$), with 1.5 g of the Yb catalyst of Embodiment 13 (active site: YbVO$_4$) is called a Mn/Yb catalyst of Embodiment 14.

Embodiment 15: Synthesis of Yb—Se(S,500) Catalyst

A solid (Yb—Se) synthesized by using 4.56 g of a TiO$_2$ support including 3 wt % of Se (promoter) based on the total weight of TiO$_2$, in the same manner as Embodiment 13 except that a calcination process is performed at 400° C. for 3 hours is mounted in a reactor, is exposed to SO$_2$ and O2 diluted in N$_2$ and simultaneously supplied at a flow rate of 500 mLmin$^{-1}$, at atmospheric pressure at 400° C. for 45 minutes, and then is cooled to room temperature in a N$_2$ atmosphere. In the exposure process, the content of SO$_2$ is 500 ppm and the content of O2 is 3 vol %. The finally obtained catalyst is called a Yb—Se(S,500) catalyst of Embodiment 15.

Embodiment 16: Synthesis of Mn—Se/Yb—Se(S,500) Catalyst

A solid obtained by mechanically mixing 1.5 g of the Mn—Se catalyst of Embodiment 7 including 2 wt % of V (active site: MnV$_2$O$_6$; promoter: Se), with 1.5 g of the solid Yb—Se used to synthesize the catalyst of Embodiment 15 (active site: YbVO$_4$; promoter: Se) is mounted in a reactor, is exposed to SO$_2$ and O2 diluted in N$_2$ and simultaneously supplied at a flow rate of 500 mLmin$^{-1}$, at atmospheric pressure at 400° C. for 45 minutes, and then is cooled to room temperature in a N$_2$ atmosphere. In the exposure process, the content of SO$_2$ is 500 ppm and the content of O2 is 3 vol %. The finally obtained catalyst is called a Mn—Se/Yb—Se(S,500) catalyst of Embodiment 16.

Embodiments 17 to 22: Synthesis of Mn—Sb$_1$, Mn—Sb$_3$, Mn—Sb$_5$, Mn—Sb$_1$(S,500), Mn—Sb$_3$(S,500), and Mn—Sb$_5$(S,500) Catalysts To prepare TiO$_2$ supports including 1 wt %, 3 wt %, and 5 wt % of Sb based on the total weight of TiO$_2$, 49.5 g of TiO$_2$ is added to 500 mL of acetic acid in which 1.23 g of Sb(CH$_3$COO)$_3$ is dissolved (to include 0.5 g of Sb), 48.5 g of TiO$_2$ is added to 500 mL of acetic acid in which 3.68 g of Sb(CH$_3$COO)$_3$ is dissolved (to include 1.5 g of Sb), or 47.5 g of TiO$_2$ is added to 500 mL of acetic acid in which 6.14 g of Sb(CH$_3$COO)$_3$ is dissolved (to include 2.5 g of Sb), and then stirring and dehydration processes are performed and a calcination process is performed at 500° C. for 5 hours. The prepared supports are called Sb$_1$, Sb$_3$, and Sb$_5$ supports. Catalysts of Embodiments 17 to 19 are synthesized by using 6 g of the supports in the same manner as Embodiment 1. The synthesized catalysts are called Mn—Sb$_1$, Mn—Sb$_3$, and Mn—Sb$_5$ catalysts. The catalysts of Embodiments 17 to 19 are characterized in that TiO$_2$ supports having an anatase phase and including 1 wt %, 3 wt %, and 5 wt % of Sb are used and MnV$_2$O$_6$ is included in the supports as an active site. Catalysts of Embodiments 20 to 22, which are synthesized by functionalizing the surfaces of the Mn—Sb$_1$, Mn—Sb$_3$, and Mn—Sb$_5$ catalysts with SO$_Y^{2-}$ in the same manners as Embodiments 4 to 6, are called Mn—Sb$_1$(S,500), Mn—Sb$_3$(S,500), and Mn—Sb$_5$(S,500) catalysts, respectively.

Embodiments 23 and 24: Synthesis of CeVO$_4$ and CeVO$_4$(S,500) Catalysts

A TiO$_2$ support including 2 wt % of Sb based on the total weight of TiO$_2$ is prepared by adding 9.8 g of TiO$_2$ to 150 mL of acetic acid in which 0.49 g of Sb(CH$_3$COO)$_3$ is dissolved (to include 0.2 g of Sb), performing stirring and dehydration processes, and then performing a calcination process at 500° C. for 5 hours. A mixture solution is prepared by adding 9.46 g of the support to 100 mL of distilled water in which 3.93 mmol of NH$_4$VO$_3$ is dissolved and 200 mL of distilled water in which 1.96 mmol of Ce salt (e.g., Ce(NO$_3$)$_3$.6H$_2$O) is dissolved, and then is stirred for 2 hours and is dehydrated. A CeVO$_4$ catalyst of Embodiment 23 is synthesized by calcining a solid obtained after dehydration, at 500° C. for 5 hours. The catalyst of Embodiment 23 is characterized in that a TiO$_2$ support having an anatase phase and including Sb is used and CeVO$_4$ is included in the support as an active site. A catalyst of Embodiment 24, which is synthesized by functionalizing the surface of the CeVO$_4$ catalyst with SO$_Y^{2-}$ in the same manner as Embodiments 4 to 6, is called a CeVO$_4$(S,500) catalyst.

Embodiments 25 and 26: Synthesis of Mn—Sb$_3$/CeVO$_4$ and Mn—Sb$_3$/CeVO$_4$(S,500) Catalysts A mixture solution is prepared by adding 50 mL of distilled water in which 5.86 g of the Sb$_3$ support of Embodiment 17 is dispersed, to 70 mL of distilled water in which 0.59 mmol of Ce salt (e.g., $Ce(NO_3)_3 \cdot 6H_2O$) is dissolved and 170 mL of distilled water in which 1.18 mmol of V salt (e.g., $NH_4VO_3$) is dissolved. The mixture solution is stirred for 18 hours, is added with 120 mL of distilled water in which 0.59 mmol of Mn salt (e.g., $Mn(NO_3)_2 \cdot 6H_2O$) and 1.18 mmol of V salt (e.g., $NH_4VO_3$) is dissolved, is stirred for 18 hours, and then is dehydrated. A $Mn-Sb_3/CeVO_4$ catalyst of Embodiment 25 is synthesized by calcining a solid obtained after dehydration, at 500° C. for 5 hours. The catalyst of Embodiment 25 is characterized in that a $TiO_2$ support having an anatase phase and including 3 wt % of Sb is used and $MnV_2O_6$ and $CeVO_4$ are included in the support as active sites. A catalyst of Embodiment 26, which is synthesized by functionalizing the surface of the $Mn-Sb_3/CeVO_4$ catalyst with $SO_y^{2-}$ in the same manner as Embodiments 4 to 6, is called a $Mn-Sb_3/CeVO_4(S,500)$ catalyst.

Experimental Example 1: Analysis of Catalytic Characters

Figures 2A, 2B:
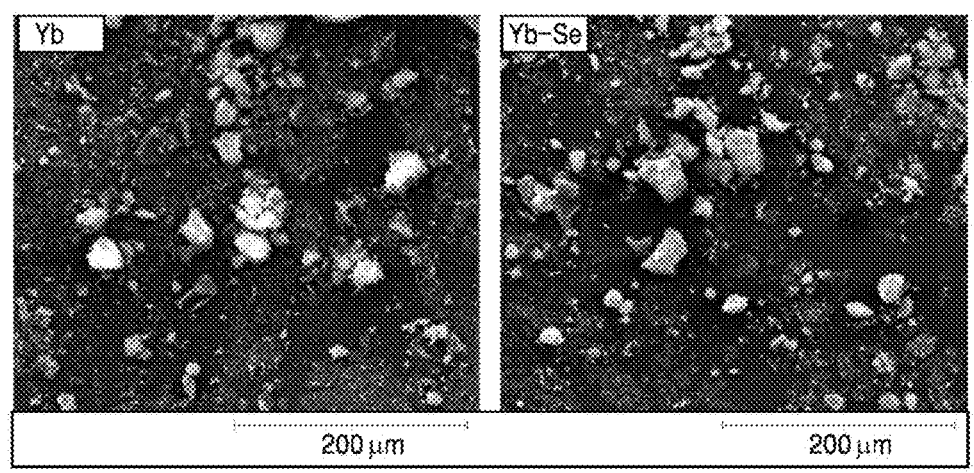
FIGS. 2A and 2B are scanning electron microscopy (SEM) images of images of catalysts synthesized according to Embodiments 13 and 15 of the present invention.
Figure 3A:
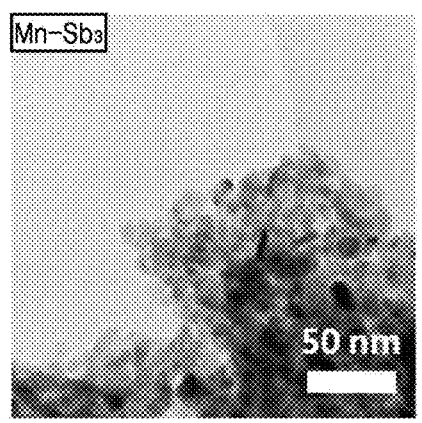
FIGS. 3A and 3B are HRTEM images of catalysts synthesized according to Embodiments 18 and 23 of the present invention.
Figure 3B:
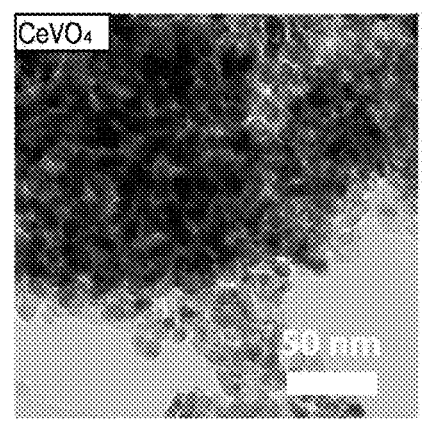

Morphologies of the catalysts synthesized according to Embodiments 1 to 3 are analyzed using high-resolution transmission electron microscopy (HRTEM), and results thereof are shown in FIGS. 1A to 1C, respectively. Morphologies of the catalysts synthesized according to Embodiments 13 and 15 are analyzed using scanning electron microscopy (SEM), and results thereof are shown in FIGS. 2A and 2B, respectively. Morphologies of the catalysts synthesized according to Embodiments 18 and 23 are analyzed using HRTEM, and results thereof are shown in FIGS. 3A and 3B, respectively.

Referring to FIGS. 1 to 3, it is shown that $TiO_2$ agglomerates having grain sizes (maximum diameters) of several hundred nanometers to several hundred micrometers configure porous supports in the synthesized catalysts.

To check porosity of the catalysts of Embodiments 1 to 3, 13, 18, and 23, Brunauer-Emmett-Teller (BET) surface areas and Brunauer-Joyner-Halenda (BJH) pore volumes are measured by performing $N_2$ physisorption tests. In addition, components of the catalysts synthesized according to Embodiments 1 to 3, 13, 18, and 23 are analyzed using X-ray fluorescence (XRF). Results thereof are shown in Table 2.

fully dispersed in the porous $TiO_2$ supports on the surfaces of the catalysts of Embodiments 1 to 3, 13, and 18.

Meanwhile, the $CeVO_4$ catalyst provides a V:Ce molar ratio of 2:1 due to lack of Ce compared to a theoretical V:Ce molar ratio (V:Ce=1:1) of $CeVO_4$. This means that additional Lewis acid sites may be created on Ce or V sites of $CeVO_4$ dispersed in the surface of the $TiO_2$ support, by adjusting stoichiometry of Ce/V.

Figure 4:
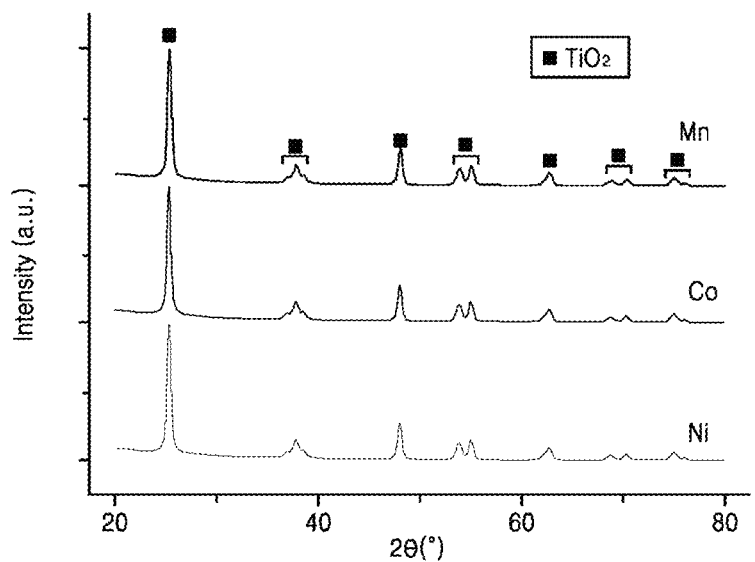
FIG. 4 is a graph showing X-ray diffraction (XRD) patterns of the catalysts synthesized according to Embodiments 1 to 3 of the present invention.
Figure 5:
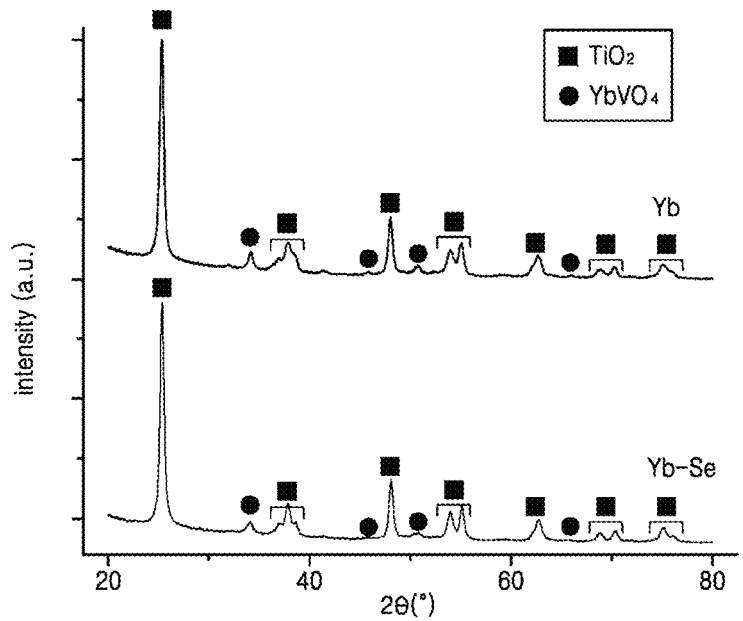
FIG. 5 is a graph showing XRD patterns of the catalysts synthesized according to Embodiments 13 and 15 of the present invention.
Figure 6A:
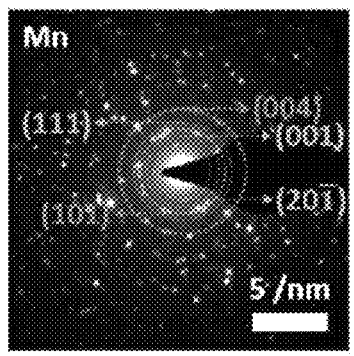
FIGS. 6A to 6C images showing selected area electron diffraction (SAED) patterns of the catalysts synthesized according to Embodiments 1 to 3 of the present invention.
Figure 6B:
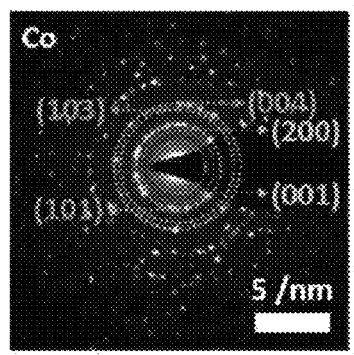
Figure 6C:
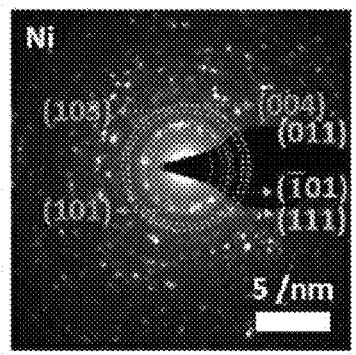

Crystal structures of Embodiments 1 to 3 are analyzed using an X-ray diffractomer, and X-ray diffraction (XRD) patterns obtained as results thereof are shown in FIG. 4. Crystal structures of Embodiments 13 and 15 are analyzed using an X-ray diffractomer, and XRD patterns obtained as results thereof are shown in FIG. 5. A crystal structure of Embodiment 23 is analyzed using an X-ray diffractomer, and an XRD pattern obtained as a result thereof is shown in FIG. 7.

Figure 7:
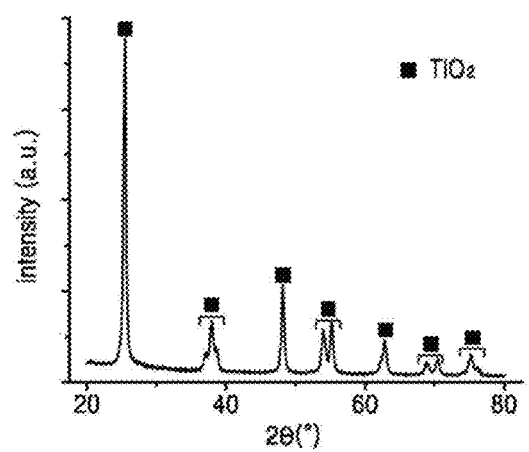
FIG. 7 includes a graph and image showing a XRD pattern and a SAED pattern of the catalyst synthesized according to Embodiment 23 of the present invention.
Figure 7:
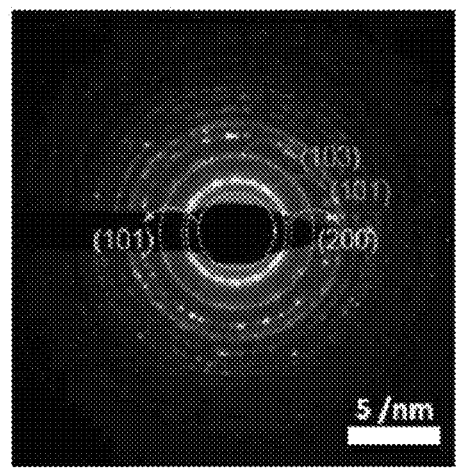

Referring to FIGS. 4, 5, and 7, tetragonal crystal planes corresponding to an anatase phase, which mean a $TiO_2$ support, are observed from all of Embodiments 1 to 3, 13, 15, and 23. Meanwhile, crystal planes meaning $MnV_2O_6$, $CoV_2O_6$, $NiV_2O_6$, and $CeVO_4$ crystal grains are not observed from Embodiments 1 to 3, and 23. This may be because the size or content of metal vanadate crystal grains dispersed in the support is too small for XRD analysis. Therefore, the Mn, Co, and Ni catalysts of Embodiments 1 to 3 and the $CeVO_4$ catalyst of Embodiment 23 are analyzed using selected area electron diffraction (SAED) patterns, and results thereof are shown in FIGS. 6A to 6C, and 7, respectively.

Referring to FIG. 6, monoclinic (2 0 −1), (0 0 1), and (1 1 1) crystal planes of $MnV_2O_6$ are observed from the Mn catalyst, monoclinic (0 0 1) and (2 0 0) crystal planes of $CoV_2O_6$ are observed from the Co catalyst, triclinic (−1 0 1), (0 1 1), and (1 1 1) crystal planes of $NiV_2O_6$ are observed from the Ni catalyst, and tetragonal (1 0 1) and (2 0 0) crystal planes of $CeVO_4$ are observed from the $CeVO_4$ catalyst.

In addition, tetragonal crystal planes corresponding to an anatase phase of $TiO_2$, which mean a $TiO_2$ support, are observed from all of Embodiments 1 to 3. Specifically, Embodiment 1 shows (1 0 1) and (0 0 4) crystal planes, Embodiments 2 and 3 show (1 0 1), (1 0 3), and (0 0 4) crystal planes, and Embodiment 23 shows (1 0 1) and (1 0

TABLE 2

| | BET surface area | BJH pore volume | Catalyst component content (wt %) |
|---|---|---|---|
| Embodiment 1 | 63 $m^2 g^{-1}$ | 0.3 $cm^3 g^{-1}$ | V: 1.9 (±0.1), Mn: 0.9 (±0.1) |
| Embodiment 2 | 64 $m^2 g^{-1}$ | 0.3 $cm^3 g^{-1}$ | V: 1.9 (±0.1), Co: 1.3 (±0.4) |
| Embodiment 3 | 66 $m^2 g^{-1}$ | 0.3 $cm^3 g^{-1}$ | V: 1.9 (±0.1), Ni: 1.5 (±0.5) |
| Embodiment 13 | 63 $m^2 g^{-1}$ | 0.3 $cm^3 g^{-1}$ | V: 1.9 (±0.1), Yb: 6.7 (±0.3) |
| Embodiment 18 | 58 $m^2 g^{-1}$ | 0.2 $cm^3 g^{-1}$ | V: 2.1 (±0.1), Mn: 0.9 (±0.2) |
| Embodiment 23 | 61 $m^2 g^{-1}$ | 0.3 $cm^3 g^{-1}$ | V: 2.1 (±0.1), Ce: 3.4 (±0.2) |

The results of measuring the BET surface areas and the BJH pore volumes show that the catalysts synthesized according to Embodiments 1 to 3, 13, 18, and 23 have porous structures. The results of analyzing the components show that the catalysts have almost the same content, e.g., 2 wt %, of V based on total weights of the catalysts.

It is shown that V:metal (Mn, Co, and Ni) molar ratios of the Mn, Co, Ni, and $Mn-Sb_3$ catalysts have values close to a theoretical molar ratio (V:metal=2:1). It is also shown that a V:Yb molar ratio of the Yb catalyst also has a value close to a theoretical molar ratio (V:Yb=1:1). As such, it is shown that $MnV_2O_6$, $CoV_2O_6$, $NiV_2O_6$, and $YbVO_4$ are success- 3) crystal planes. These results are consistent with the XRD pattern results of FIGS. 4 and 7.

As shown in FIGS. 4 and 7, a pattern of another material other than a metal vanadate, e.g., V oxide or oxide of another metal (Mn, Co, Ni, or Ce), is not observed from Embodiments 1 to 3, and 23. That is, Embodiments 1 to 3, and 23 of the present invention show that Vanadium oxides and oxides of metal (Mn, Co, Ni, or Ce) other than Vanadium form a composite oxide and are not merely provided as a mixture of different materials.

Differently from the XRD patterns of Embodiments 1 to 3, and 23, tetragonal $YbVO_4$ crystal planes are observed from the XRD patterns of Embodiments 13 and 15 (see FIG. 5). In addition, a pattern of another material other than $YbVO_4$, e.g., V oxide or Yb oxide, is not observed from Embodiments 13 and 15. That is, Embodiments 13 and 15 of the present invention show that V oxide and Yb oxide are transformed into a composite oxide, e.g., $YbVO_4$, and are not provided as a mixture of different materials.

$NH_3$-SCR performance analysis results of the catalysts according to Embodiments 1 to 26 of the present invention and Comparative Examples 1 to 5 will now be described with reference to FIGS. 8 to 18.

Experimental Example 2: $NH_3$-SCR Performance Analysis (1)

Figure 8:
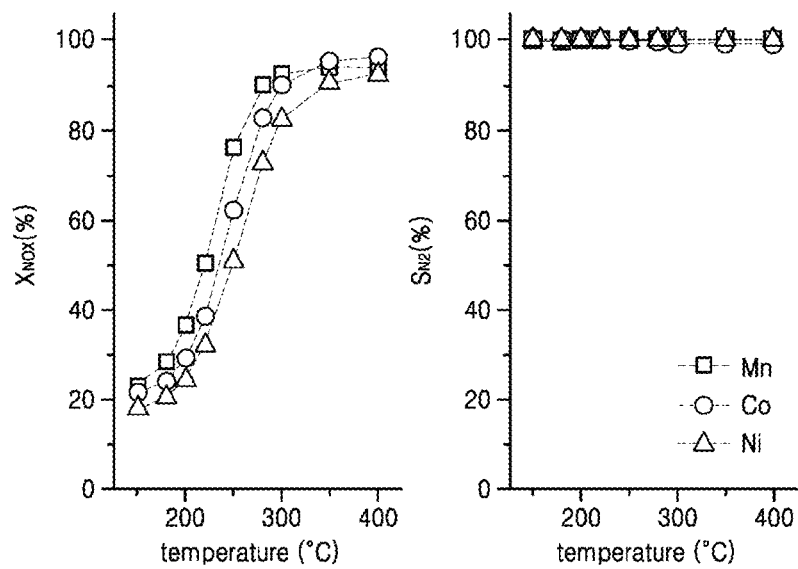
FIGS. 8 to 18 are graphs showing selective catalytic reduction of NO$_X$ by NH$_3$ (NH$_3$-SCR) performance analysis results of catalysts according to embodiments of the present invention and comparative examples.

Performance of a $NH_3$-SCR process is measured using the catalysts of Embodiments 1 to 3. In a temperature range of 150° C. to 400° C., $NO_X$ conversions $X_{NOX}$ and $N_2$ selectivities $S_{N2}$ in a case when $H_2O$ is injected are shown in FIG. 8. The $NH_3$-SCR process is performed under conditions that a reaction fluid includes 800 ppm of $NO_x$, 800 ppm of $NH_3$, 3 vol % of $O_2$, 6 vol % of $H_2O$, and an inert gas of $N_2$, a total flow rate is 500 mLmin$^{-1}$, and a space velocity is 60,000 hr$^{-1}$.

Referring to FIG. 8, although a considerable amount of water vapor ($H_2O$) is included in the reaction gas, all of Embodiments 1 to 3 show desirable activities at a temperature equal to or lower than 400° C. Specifically, it is shown that the $NO_X$ conversions $X_{NOX}$ are equal to or higher than 50% at a temperature equal to or higher than 250° C. and reach 90% at a temperature equal to or higher than 350° C. It is also shown that the $N_2$ selectivities $S_{N2}$ are almost 100% in the entire temperature range. This means that the catalysts of Embodiments 1 to 3 are usable as $NH_3$-SCR catalysts applied to power plants, sintering furnaces, and vessels.

Experimental Example 3: $NH_3$-SCR Performance Analysis (2)

Figure 9:
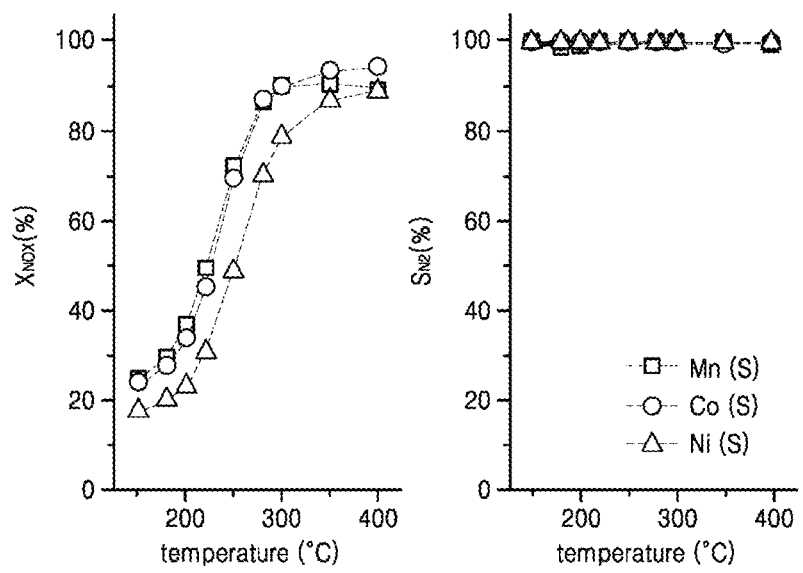

Performance of a $NH_3$-SCR process is measured using the catalysts of Embodiments 4 to 6 under the same conditions as Experimental Example 2, and $NO_X$ conversions $X_{NOX}$ and $N_2$ selectivities $S_{N2}$ are shown in FIG. 9. The surfaces of all of the catalysts of Embodiments 4 to 6 are poisoned by $SO_2$ or are $SO_Y^{2-}$-functionalized by $SO_2/O_2$ before $NH_3$-SCR. (Specific conditions thereof are described above in Embodiments 4 to 6.) Referring to FIG. 9, similarly to Experimental Example 2, although a considerable amount of water vapor ($H_2O$) is included during reaction, desirable activities are shown at a temperature equal to or lower than 400° C. Specifically, it is shown that the $NO_X$ conversions $X_{NOX}$ are equal to or higher than 50% at a temperature equal to or higher than 250° C. and reach 90% at a temperature equal to or higher than 350° C. It is also shown that the $N_2$ selectivities $S_{N2}$ are almost 100% in the entire temperature range. This means that the surfaces of the catalysts of Embodiments 4 to 6 are preferably functionalized with $SO_Y^{2-}$ and poisoning thereof by $SO_2$ is minimized. This also means that the catalysts of Embodiments 4 to 6 are applicable to power plants, sintering furnaces, and vessels and are usable as $NH_3$-SCR catalysts for reducing $NO_X$ in an exhaust gas including a considerable amount of $SO_2$.

Experimental Example 4: $NH_3$-SCR Performance Analysis (3)

Performance of a $NH_3$-SCR process is measured using the catalysts of Embodiments 4 to 6 and the catalyst of Comparative Example 2. The $NH_3$-SCR process is performed under conditions that a reaction fluid includes 800 ppm of $NO_x$, 800 ppm of $NH_3$, 500 ppm of $SO_2$, 3 vol % of $O_2$, 6 vol % of $H_2O$, and an inert gas of $N_2$, a total flow rate is 500 mLmin$^{-1}$, and a space velocity is 60,000 hr$^{-1}$. $NO_X$ conversions $X_{NOX}$ and $N_2$ selectivities $S_{N2}$ are shown in FIG. 10.

Figure 10:
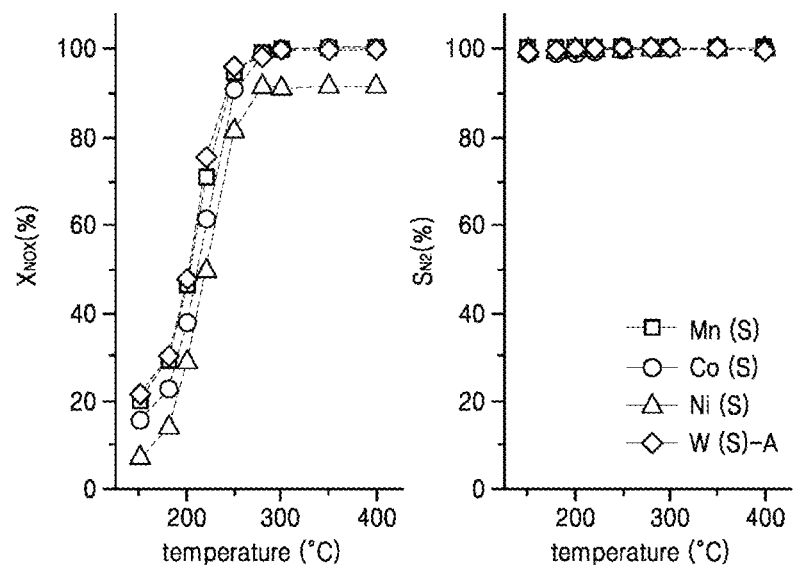

Referring to FIG. 10, all of the catalysts of Embodiments 4 to 6 show excellent catalytic characters as catalysts for reducing $NO_X$ in an exhaust gas including considerable amounts of water vapor ($H_2O$) and $SO_2$. It is shown that the $N_2$ selectivities $S_{N2}$ of the catalysts of Embodiments 4 to 6 are almost 100% in the entire reaction temperature range. It is also shown that the $NO_X$ conversions $X_{NOX}$ of the catalysts of Embodiments 4 to 6 are similar to or only slightly different (by 15% or less) from that of the commercial catalyst of Comparative Example 2 in a temperature range of 250° C. to 400° C. This means that poisoning of the surfaces of the catalysts of Embodiments 4 to 6 by $SO_2$ is minimized due to functionalization with $SO_Y^{2-}$. As such, it is shown that the catalysts of Embodiments 4 to 6 of the present invention may replace the high-priced commercial catalyst of Comparative Example 2.

Experimental Example 5: $NH_3$-SCR Performance Analysis (4)

Performance of a $NH_3$-SCR process is measured using the catalysts of Embodiments 9 to 11 and the catalyst of Comparative Example 4. The surfaces of all of the catalysts of Embodiments 9 to 11 and Comparative Example 4 are poisoned by $SO_2$ or are $SO_Y^{2-}$-functionalized by $SO_2/O_2$ before $NH_3$-SCR, and a functionalization temperature used in this case is changed to 300° C. (Embodiment 10), to 400° C. (Embodiment 9 and Comparative Example 4), and to 500° C. (Embodiment 11).

The $NH_3$-SCR process is performed under conditions that a reaction fluid includes 800 ppm of $NO_x$, 800 ppm of $NH_3$, 3 vol % of $O_2$, 6 vol % of $H_2O$, and an inert gas of $N_2$, a total flow rate is 500 mLmin$^{-1}$, and a space velocity is 60,000 hr$^{-1}$. $NO_X$ conversions $X_{NOX}$ and $N_2$ selectivities $S_{N2}$ are shown in FIG. 11.

Figure 11:
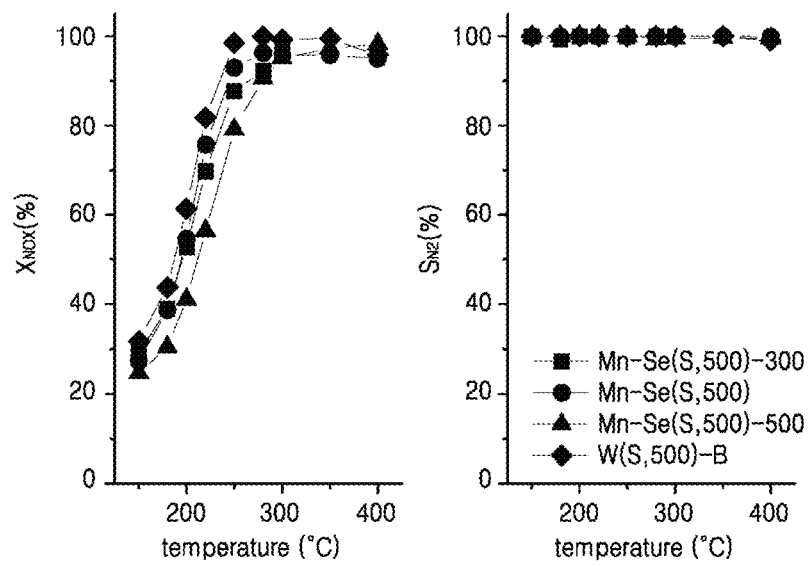

Referring to FIG. 11, the catalysts of Embodiments 9 to 11 are catalysts to which Se is added as a promoter, and show increased activities in a low reaction temperature range compared to the Mn(S) catalyst of Embodiment 4 to which Se in not added. This means that a larger amount of an acid site is created on the surfaces of the catalysts of Embodiments 9 to 11 or an improved redox character is achieved due to addition of Se.

In addition, the catalysts of Embodiments 9 to 11 may adjust $NH_3$-SCR activities by changing a temperature used for $SO_4^{2-}$ functionalization. Meaningfully, the $NO_X$ conversions $X_{NOX}$ of the catalysts of Embodiments 9 and 10 are similar to or only slightly different (by 10% or less) from that of the commercial catalyst of Comparative Example 4 in a temperature range of 220° C. to 400° C. As such, it is shown that the catalysts of Embodiments 9 and 10 of the present invention may replace the high-priced commercial catalyst of Comparative Example 4.

Experimental Example 6: $NH_3$-SCR Performance Analysis (5)

Performance of a $NH_3$-SCR process is measured using the Mn—Se catalysts of Embodiments 7 to 9 and the W catalysts of Comparative Examples 1, 3, and 4. The $NH_3$-SCR process is performed under conditions that a reaction fluid includes 800 ppm of $NO_x$, 800 ppm of $NH_3$, 3 vol % of $O_2$, 6 vol % of $H_2O$, and an inert gas of $N_2$, a total flow rate is 500 $mLmin^{-1}$, and a space velocity is 60,000 $hr^{-1}$. In this case, the content of $SO_2$ in the reaction fluid is changed to 0 ppm, to 30 ppm, and to 500 ppm.

$NO_X$ conversions $X_{NOX}$ and $N_2$ selectivities $S_{N2}$ in a temperature range of 150° C. to 400° C. are shown in FIG. 11.

Figure 12:
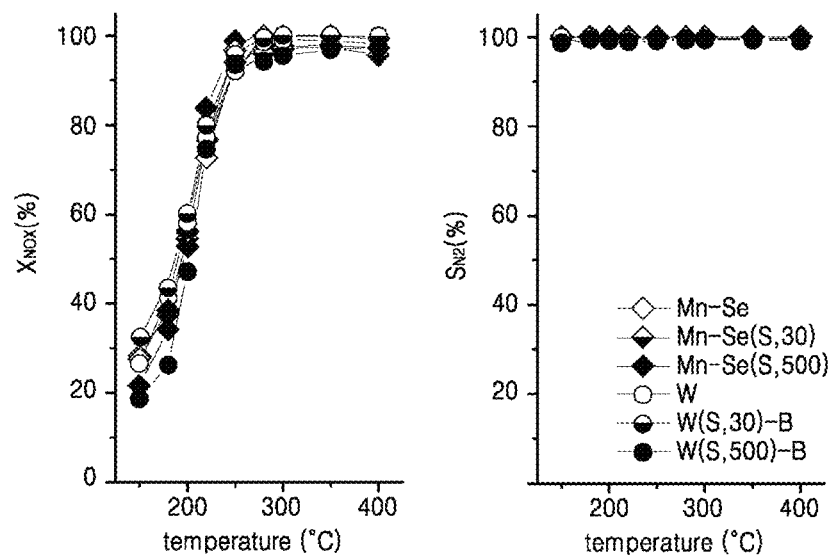

Referring to FIG. 12, the Mn—Se catalysts of Embodiments 7 to 9 show similar or gradually increasing $NH_3$-SCR performance values at a temperature equal to or higher than 180° C. as the concentration of $SO_2$ is increased from 0 ppm to 30 ppm and to 500 ppm. This means that, as a Mn—Se catalyst is functionalized with $SO_Y^{2-}$, 1) a larger amount of an acid site is created on the catalyst surface, 2) a $NO_X$ turnover cycle is improved based on desirable binding force with a reactant, 3) an improved redox character is achieved, or 4) a resistance against $SO_2$, AS, or ABS is increased.

On the contrary, the W catalyst of Comparative Example 1, which is not sulfated, and the W catalyst of Comparative Example 3, which is sulfated using 30 ppm of $SO_2$, show similar $NH_3$-SCR performance values at a temperature equal to or higher than 180° C. However, compared to the W catalysts of Comparative Examples 1 and 3, the W catalyst of Comparative Example 4, which is sulfated using 500 ppm of $SO_2$, shows remarkably lowered $NH_3$-SCR performance values at a temperature equal to or lower than 200° C. This means that, compared to the commercial catalysts, the Mn—Se catalysts proposed by the present invention may provide desirable properties after $SO_Y^{2-}$ functionalization and thus may replace the high-priced commercial catalysts.

Experimental Example 7: $NH_3$-SCR Performance Analysis (6)

Performance of a $NH_3$-SCR process is measured using the Mn—Se(S,500)-Na catalyst of Embodiment 12 and the W(S,500)-B—Na catalyst of Comparative Example 5. In this case, the $NH_3$-SCR process is performed under conditions that a reaction fluid includes 800 ppm of $NO_x$, 800 ppm of $NH_3$, 500 ppm of $SO_2$, 3 vol % of $O_2$, 6 vol % of $H_2O$, and an inert gas of $N_2$, a total flow rate is 500 $mLmin^{-1}$, and a space velocity is 60,000 $hr^{-1}$. $NO_X$ conversions $X_{NOX}$ and $N_2$ selectivities $S_{N2}$ of the catalysts of Embodiments 9 and 12 and Comparative Examples 4 and 5 in a temperature range of 150° C. to 400° C. are shown in FIG. 13.

Figure 13:
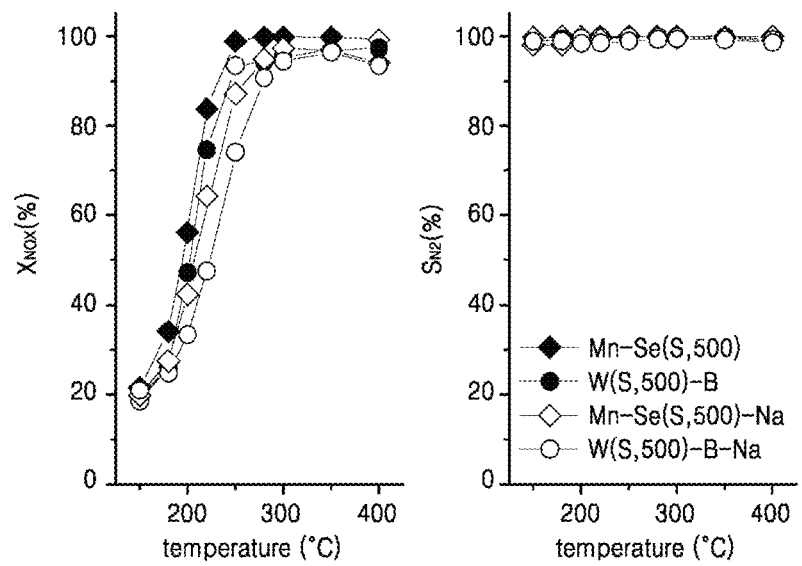

Referring to FIG. 13, compared to the Mn—Se(S,500) catalyst of Embodiment 9 and the W(S,500)-B catalyst of Comparative Example 4, the Mn—Se(S,500)-Na catalyst of Embodiment 12 and the W(S,500)-B—Na catalyst of Comparative Example 5, the surfaces of which are poisoned by Na, show lowered $NH_3$-SCR performance values, and this may be because of Na poisoning. However, relatively, the catalyst of Embodiment 12 shows excellent performance values compared to the catalyst of Comparative Example 5. This means that, in the Mn—Se(S,500) catalyst proposed by the present invention, after $SO_Y^{2-}$ functionalization, 1) binding between the catalyst surface and Na is minimized by minimizing distribution of acid sites having strong binding force with an alkaline compound, and 2) a desirable resistance against Na poisoning is achieved compared to the commercial catalyst of Comparative Example 4. As such, it is shown that the catalyst according to an embodiment of the present invention may have an excellent catalytic character to replace the high-priced commercial catalyst.

Experimental Example 8: $NH_3$-SCR Performance Analysis (7)

Figure 14:
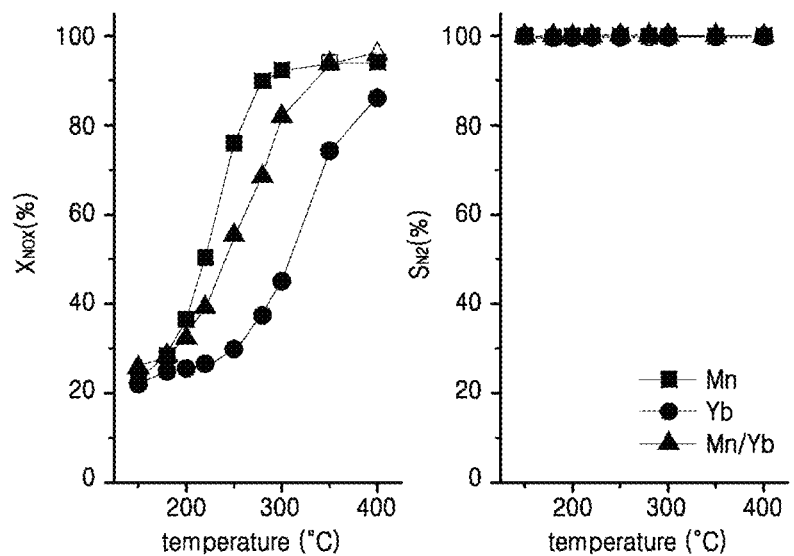

Performance of a $NH_3$-SCR process is measured using the Mn catalyst of Embodiment 1, the Yb catalyst of Embodiment 13, and the Mn/Yb catalyst of Embodiment 14. In a temperature range of 150° C. to 400° C., $NO_X$ conversions $X_{NOX}$ and $N_2$ selectivities $S_{N2}$ in a case when $H_2O$ is injected are shown in FIG. 14. The $NH_3$-SCR process is performed under conditions that a reaction fluid includes 800 ppm of $NO_x$, 800 ppm of $NH_3$, 3 vol % of $O_2$, 6 vol % of $H_2O$, and an inert gas of $N_2$, a total flow rate is 500 $mLmin^{-1}$, and a space velocity is 60,000 $hr^{-1}$.

Referring to FIG. 14, although a considerable amount of water vapor ($H_2O$) is included, it is shown that the $N_2$ selectivities $S_{N2}$ of all catalysts are almost 100% in the entire temperature range. In addition, differently from Embodiment 1 in which $MnV_2O_6$ showing a desirable activity at a temperature equal to or lower than 400° C. serves as an active site, Embodiment 13 in which $YbVO_4$ serves as an active site shows a low activity compared to Embodiment 1.

Specifically, it is shown that the $NO_X$ conversions $X_{NOX}$ of Embodiments 1 and 13 differ by 30% to 60% in a temperature range of 200° C. to 400° C. This means that $YbVO_4$ showing an excellent $NH_3$-SCR activity in a high temperature range may not be easily used as an active site of a catalyst due to a low $NO_X$ conversion $X_{NOX}$ in a low temperature range.

However, it is shown that the $NO_X$ conversion $X_{NOX}$ of Embodiment 14 in which $MnV_2O_6$ and $YbVO_4$ active sites are mixed is increased from that of Embodiment 13 by 10% to 40% in a temperature range of 200° C. to 400° C. This means that a mixture of $MnV_2O_6$ and $YbVO_4$ active sites at a desirable ratio may effectively increase the $NH_3$-SCR activity in low and high temperature ranges and may be broadly used as a $NH_3$-SCR catalyst for heavy equipment and vehicles as well as power plants, sintering furnaces, and vessels.

Experimental Example 9: $NH_3$-SCR Performance Analysis (8)

Performance of a $NH_3$-SCR process is measured using the Mn—Se(S,500) catalyst of Embodiment 9, the Yb—Se(S, 500) catalyst of Embodiment 15, and the Mn—Se/Yb—Se (S,500) catalyst of Embodiment 16, commonly including Se as a promoter and respectively including $MnV_2O_6$, $YbVO_4$, and a mixture of $MnV_2O_6$ and $YbVO_4$ as active sites. (Specific conditions for synthesizing the Mn—Se/Yb—Se (S,500) catalyst are described above in Embodiment 16.) The surfaces of all of the catalysts of Embodiments 9, 15, and 16 are poisoned by $SO_2$ or are $SO_Y^{2-}$-functionalized by $SO_2/O_2$ before $NH_3$-SCR.

In this case, the $NH_3$-SCR process is performed under conditions that a reaction fluid includes 800 ppm of $NO_x$, 800 ppm of $NH_3$, 500 ppm of $SO_2$, 3 vol % of $O_2$, 6 vol % of $H_2O$, and an inert gas of $N_2$, a total flow rate is 500 $mLmin^{-1}$, and a space velocity is 60,000 $hr^{-1}$. $NO_X$ conversions $X_{NOX}$ and $N_2$ selectivities $S_{N2}$ of the catalysts of Embodiments 9, 15, and 16 in a temperature range of 150° C. to 400° C. are shown in FIG. 15.

Figure 15:
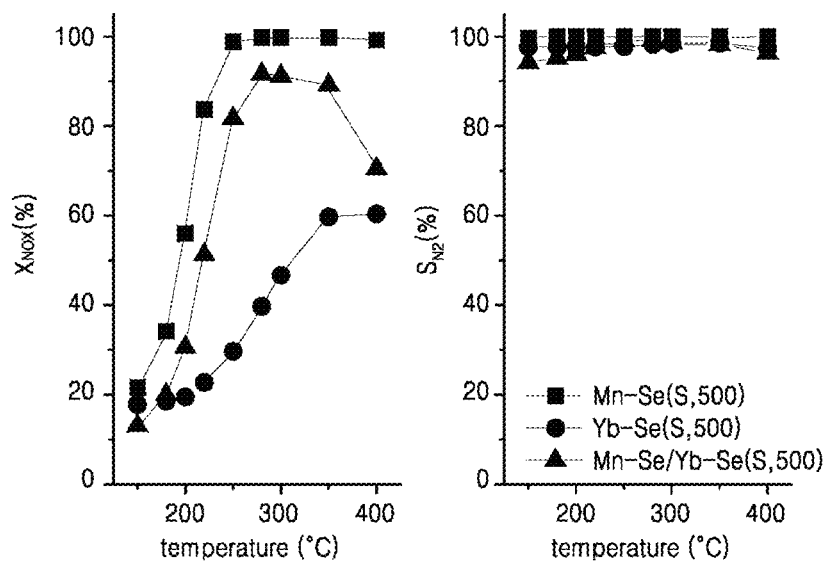

Referring to FIG. 15, although considerable amounts of $SO_2$ and water vapor ($H_2O$) are included, it is shown that the $N_2$ selectivities $S_{N2}$ of all catalysts are equal to or higher than 95% in the entire temperature range. In addition, differently from Embodiment 9 in which $MnV_2O_6$ showing a desirable activity at a temperature equal to or lower than 400° C.

serves as an active site, Embodiment 15 in which YbVO$_4$ serves as an active site shows a low activity compared to Embodiment 9.

Specifically, it is shown that the NO$_X$ conversions X$_{NOX}$ of Embodiments 9 and 15 differ by 35% to 70% in a temperature range of 200° C. to 400° C. This means that YbVO$_4$ showing an excellent NH$_3$-SCR activity in a high temperature range may not be easily used as an active site of a catalyst due to a low NO$_X$ conversion X$_{NOX}$ in a low temperature range. However, it is shown that the NO$_X$ conversion X$_{NOX}$ of Embodiment 16 in which MnV$_2$O$_6$ and YbVO$_4$ active sites are mixed is increased from that of Embodiment 15 by 10% to 55% in a temperature range of 200° C. to 400° C. This means that a mixture of MnV$_2$O$_6$ and YbVO$_4$ active sites at a desirable ratio may effectively increase the NH$_3$-SCR activity in an environment including SO$_2$ in low and high temperature ranges and may be broadly used as a NH$_3$-SCR catalyst for heavy equipment and vehicles as well as power plants, sintering furnaces, and vessels.

Experimental Example 10: NH$_3$-SCR Performance Analysis (9)

Performance of a NH$_3$-SCR process is measured using the Mn—Sb$_1$ catalyst of Embodiment 17, the Mn—Sb$_3$ catalyst of Embodiment 18, and the Mn—Sb$_5$ catalyst of Embodiment 19, commonly including MnV$_2$O$_6$ as an active site and respectively including 1 wt %, 3 wt %, and 5 wt % of Sb based on the total weight of TiO$_2$ (about 0.5 wt %, 1.5 wt %, and 3 wt % of Sb based on a total weight of the catalyst), as promoters, and results thereof are compared to that of the Mn catalyst of Embodiment 1.

The surfaces of all of the catalysts of Embodiments 1, and 17 to 19 are poisoned by SO$_2$ or are SO$_Y^{2-}$-functionalized by SO$_2$/O$_2$ at 500° C. before NH$_3$-SCR.

In this case, the NH$_3$-SCR process is performed under conditions that a reaction fluid includes 800 ppm of NO$_X$, 800 ppm of NH$_3$, 500 ppm of SO$_2$, 3 vol % of O$_2$, 6 vol % of H$_2$O, and an inert gas of N$_2$, a total flow rate is 500 mLmin$^{-1}$, and a space velocity is 60,000 hr$^{-1}$.

Figure 16:
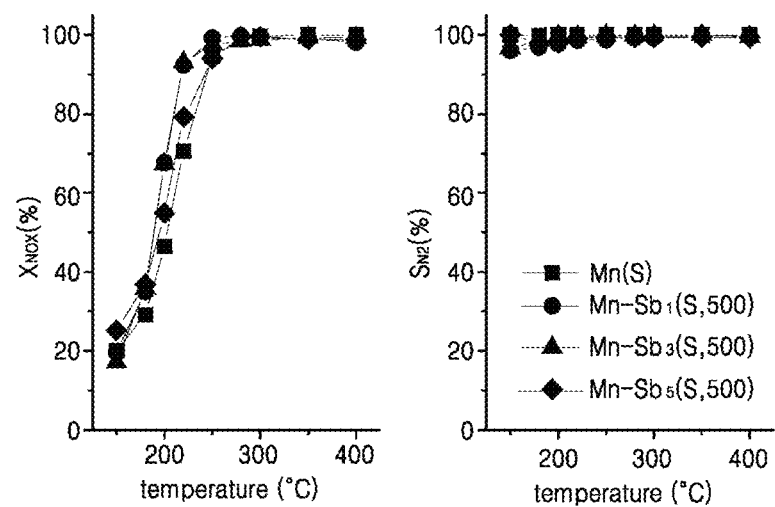

NO$_X$ conversions X$_{NOX}$ and N$_2$ selectivities S$_{N2}$ of the catalysts of Embodiments 4, and 20 to 22 in a temperature range of 180° C. to 400° C. are shown in FIG. 16.

Referring to FIG. 16, the catalysts of Embodiments 20 to 22 show excellent catalytic characters as catalysts for reducing NO$_X$ in an exhaust gas including considerable amounts of water vapor (H$_2$O) and SO$_2$. It is shown that the N$_2$ selectivities S$_{N2}$ of the catalysts of Embodiments 20 to 22 are almost 100% in the entire reaction temperature range. It is also shown that the NO$_X$ conversions X$_{NOX}$ of the catalysts of Embodiments 20 to 22 are higher than that of the catalyst of Embodiment 4 not including a Sb promoter, by 10% to 30% in a temperature range of 180° C. to 250° C.

This means that, after functionalization with SO$_Y^{2-}$, compared to the catalyst of Embodiment 4 not including a Sb promoter, in the catalysts of Embodiments 20 to 22 including Sb promoters, 1) a larger amount of an acid site is present on the catalyst surface, 2) an improved redox character is achieved, 3) poisoning by SO$_2$ is minimized, or 4) a resistance against SO$_2$, AS, or ABS is increased.

As such, it is shown that the promoter included in the catalyst may achieve an excellent effect when the content thereof is in a range of 1 wt % to 5 wt %, and more desirably, in a range of 1 wt % to 3 wt %.

Experimental Example 11: NH$_3$-SCR Performance Analysis (10)

Performance of a NH$_3$-SCR process is measured using the Mn—Sb$_3$ catalyst of Embodiment 18, the CeVO$_4$ catalyst of Embodiment 23, and the Mn—Sb$_3$/CeVO$_4$ catalyst of Embodiment 25, commonly including Sb as a promoter and respectively including MnV$_2$O$_6$, CeVO$_4$, and MnV$_2$O$_6$ and CeVO$_4$ as active sites, and results thereof are compared to that of the W(S)-A catalyst of Comparative Example 2.

The catalyst of Embodiment 25 is obtained not based on mechanical mixing but based on chemical synthesis, and has a structure in which active sites, e.g., MnV$_2$O$_6$ and CeVO$_4$, are randomly distributed in a support, e.g., TiO$_2$.

All of the catalysts of Embodiments 18, 23, and 25 and Comparative Example 2 have almost the same V content, e.g., about 2 wt %, and the surfaces thereof are poisoned by SO$_2$ or are SO$_Y^{2-}$-functionalized by SO$_2$/O$_2$ at 500° C. before NH$_3$-SCR. In this case, the NH$_3$-SCR process is performed under conditions that a reaction fluid includes 800 ppm of NO$_X$, 800 ppm of NH$_3$, 500 ppm of SO$_2$, 3 vol % of O$_2$, 6 vol % of H$_2$O, and an inert gas of N$_2$, a total flow rate is 500 mLmin$^{-1}$, and a space velocity is 60,000 hr$^{-1}$.

Figure 17:
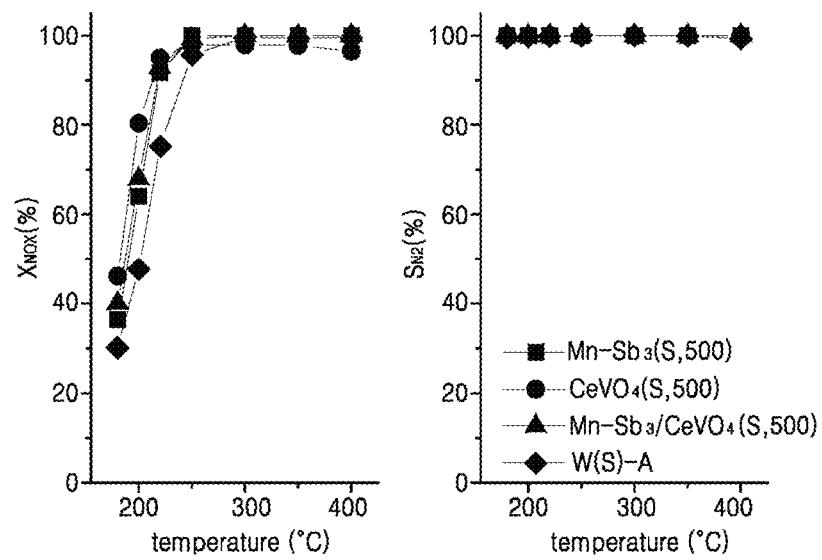

NO$_X$ conversions X$_{NOX}$ and N$_2$ selectivities S$_{N2}$ of the catalysts of Embodiments 21, 24, and 26 and Comparative Example 2 in a temperature range of 180° C. to 400° C. are shown in FIG. 17.

Referring to FIG. 17, the catalysts of Embodiments 21, 24, and 26 show excellent catalytic characters as catalysts for reducing NO$_X$ in an exhaust gas including considerable amounts of water vapor (H$_2$O) and SO$_2$. It is shown that the N$_2$ selectivities S$_{N2}$ of the catalysts of Embodiments 21, 24, and 26 are almost 100% in the entire reaction temperature range. It is also shown that the NO$_X$ conversions X$_{NOX}$ of the catalysts of Embodiments 21, 24, and 26 are almost 100% (at a temperature equal to or higher than 300° C.) similarly to that of the commercial catalyst of Comparative Example 2, or are higher than that of the commercial catalyst of Comparative Example 2 by 10% to 30% (at a temperature lower than 300° C.) in a temperature range of 180° C. to 400° C.

This means that, due to functionalization of the surfaces of the catalysts of Embodiments 21, 24, and 26 with SO$_Y^{2-}$, 1) a larger amount of an acid site is created on the catalyst surface, 2) a NO$_X$ turnover cycle is improved based on desirable binding force with a reactant, 3) an improved redox character is achieved, 4) poisoning by SO$_2$ is minimized, or 5) a resistance against SO$_2$, AS, or ABS is increased.

This also means that the catalysts of Embodiments 21, 24, and 26 of the present invention may replace the high-priced commercial catalyst of Comparative Example 2. In addition, this means that metal vanadate active sites proposed by the present invention (e.g., MnV$_2$O$_6$ and CeVO$_4$) may coexist on the support surface based on chemical synthesis, and a NH$_3$-SCR activity at a low temperature may be controlled by changing a relative ratio of the metal vanadates (e.g., a relative amount ratio of MnV$_2$O$_6$ and CeVO$_4$).

Experimental Example 12: NH$_3$-SCR Performance Analysis (11)

Performance of a NH$_3$-SCR process is measured at 220° C. by using the Mn—Sb$_3$ catalyst of Embodiment 18 and the CeVO$_4$ catalyst of Embodiment 23, commonly including Sb as a promoter and respectively including MnV$_2$O$_6$ and CeVO$_4$ as active sites, and results thereof are compared to that of the W catalyst of Comparative Example 1 at 220° C.

In this case, the NH$_3$-SCR process is performed under conditions that a reaction fluid includes 800 ppm of NO$_X$, 800 ppm of NH$_3$, 3 vol % of O$_2$, 6 vol % of H$_2$O, and an inert gas of N$_2$, a total flow rate is 500 mLmin$^{-1}$, and a space velocity is 60,000 hr$^{-1}$. Thereafter, to poison the surfaces of the catalysts of Embodiments 18 and 23 and Comparative Example 1 with SO$_2$/AS/ABS at 180° C. during NH$_3$-SCR, the reaction fluid is added with 500 ppm of SO$_2$ and is supplied to the catalyst surface for 3 hours, and the NH$_3$-SCR performance of the poisoned catalysts is measured at 220° C. in the reaction fluid (not including SO$_2$).

Then, to regenerate the catalysts poisoned with SO$_2$/AS/ABS, at a low temperature (e.g., 260° C.), a fluid satisfying the following conditions is supplied. A fluid including only 3 vol % of O$_2$ and an inert gas of N$_2$ and controlled to a total flow rate of 500 mLmin$^{-1}$ and a space velocity of 60,000 hr$^{-1}$ is supplied to the surface of the Mn—Sb$_3$ catalyst of Embodiment 18 for 1 hour. A fluid including only 3 vol % of O$_2$ and an inert gas of N$_2$ and controlled to a total flow rate of 500 mLmin$^{-1}$ and a space velocity of 60,000 hr$^{-1}$ is supplied to the surfaces of the CeVO$_4$ catalyst of Embodiment 23 and the W catalyst of Comparative Example 1 for 15 hours. After the regeneration process, performance of a NH$_3$-SCR process is measured at 220° C. in the reaction fluid (not including SO$_2$) by using the catalysts of Embodiments 18 and 23 and Comparative Example 1.

Figure 18:
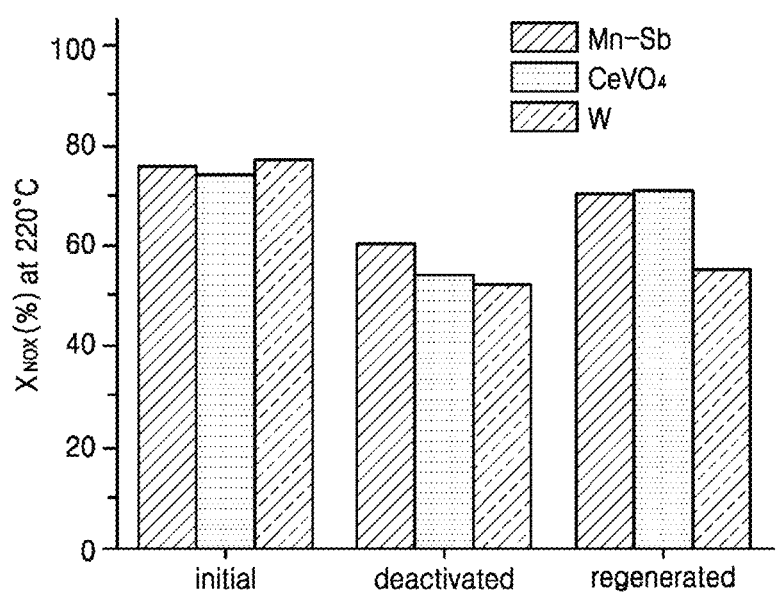

NO$_X$ conversions X$_{NOX}$ of the catalysts in initial/deactivated (or poisoned)/regenerated states at 220° C. are shown in FIG. 18. All catalysts show similar NO$_X$ conversions X$_{NOX}$ (e.g., 74% to 77%) at 220° C. before being poisoned. It is shown that the NO$_X$ conversions X$_{NOX}$ of all catalysts are lowered after being poisoned but the NO$_X$ conversions X$_{NOX}$ of the poisoned catalysts of Embodiments 18 and 23 are higher than that of the poisoned catalyst of Comparative Example 1 by 2% to 8%. This means that the catalysts of Embodiments 18 and 23 of the present invention have increased resistances against SO$_2$/AS/ABS poisoning compared to the high-priced commercial catalyst (Comparative Example 1).

More meaningfully, after the low-temperature (260° C.) regeneration process, the NO$_X$ conversions X$_{NOX}$ of the catalysts of Embodiments 18 and 23 are almost the same as those before being poisoned. This means that the catalysts of Embodiments 18 and 23 of the present invention 1) may decompose AS/ABS at a low temperature, 2) may be regenerated at a low temperature, and 3) may be recovered to have initial NH$_3$-SCR activities when regenerated at a low temperature for a longer time. Meanwhile, after the low-temperature (260° C.) regeneration process, the NO$_X$ conversion X$_{NOX}$ of the commercial catalyst (Comparative Example 1) is almost the same as that after being poisoned. This means that the commercial catalyst (Comparative Example 1) 1) may not decompose AS/ABS at a low temperature and thus may not be regenerated at a low temperature. Experimental Example 12 shows that the catalysts of Embodiments 18 and 23 may replace the high-priced commercial catalyst of Comparative Example 1 and catalysts including desirable contents of active sites and promoters as proposed by the present invention may have increased life spans compared to commercial catalysts.

As described above, according to an embodiment of the present invention, a catalyst synthesized using 1) a metal vanadate A prepared based on binding between one selected from among Mn, Co, and Ni, and V, 2) a metal vanadate B prepared based on binding between one selected from among La, Ce, Pr, Nd, Pm, Sm, Eu, Gd, Tb, Dy, Ho, Er, Tm, Yb, and Lu, and V, or 3) a mixture of the metal vanadate A and the metal vanadate B, as an active site may have a high NO$_X$ conversion and a high N$_2$ selectivity on the surface thereof in a wide NH$_3$-SCR temperature range. In addition, by 1) functionalizing the catalyst surface with SO$_Y^{2-}$ or 2) changing the amount of a metal/V precursor, an additional active site may be created, desirable interaction with NO$_X$, NH$_3$, AS, and ABS may be induced, a redox character may be improved, a resistance against poisoning or hydro-thermal aging during catalytic reaction may be increased, and a capability of decomposing AS or ABS at a low temperature may be achieved. Based on the above advantages, performance and a life span of a heterogeneous catalyst for NH$_3$-SCR may be remarkably improved. However, the above-described effects are merely examples and the scope of the present invention is not limited thereto.

While the present invention has been particularly shown and described with reference to embodiments thereof, it will be understood by one of ordinary skill in the art that various changes in form and details may be made therein without departing from the scope of the present invention as defined by the following claims.

What is claimed is:

1. A nitrogen oxide (NO$_X$) reduction catalyst comprising:
a first active site comprising a metal vanadate expressed by Chemical Formula 1

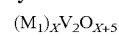

where M$_1$ denotes one selected from among manganese (Mn), cobalt (Co), and nickel (Ni), and X denotes a real number having a value between 1 and 3;

a second active site comprising a metal vanadate expressed by Chemical Formula 2

where M$_2$ denotes one selected from among lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu), and Y denotes a real number having a value between 0.5 and 1.5; and a support for loading both of the first and second active sites thereon, wherein the support comprises oxide of at least one selected from the group consisting of nitrogen (N), phosphorus (P), sulfur (S), arsenic (As), selenium (Se), antimony (Sb), tellurium (Te), polonium (Po), moscovium (Mc), livermorium (Lv), and any combination thereof, as a promoter.

2. The NO$_X$ reduction catalyst of claim 1, wherein the promoter has a composition range of 1 wt % to 5 wt % based on the total weight of the support.

3. The NO$_X$ reduction catalyst of claim 1, wherein the promoter has a composition range of 0.5 wt % to 3 wt % based on a total weight of the NO$_X$ reduction catalyst.

4. The NO$_X$ reduction catalyst of claim 1, wherein at least a part of a surface of the NO$_X$ reduction catalyst is sulfated.

5. The NO$_X$ reduction catalyst of claim 1, wherein at least a part of a surface of the NO$_X$ reduction catalyst is sulfated and functionalized with SO$_Y^{2-}$.

* * * * *